United States Patent
Hofmekler

(10) Patent No.: US 11,666,078 B2
(45) Date of Patent: Jun. 6, 2023

(54) DAIRY-BASED SUGAR SUBSTITUTE

(71) Applicant: Ori Hofmekler, Tarzana, CA (US)

(72) Inventor: Ori Hofmekler, Tarzana, CA (US)

(73) Assignee: SweetScience, LLC, Tarzana, CA (US)

( * ) Notice: Subject to any disclaimer, the term of this patent is extended or adjusted under 35 U.S.C. 154(b) by 545 days.

(21) Appl. No.: 16/716,144

(22) Filed: Dec. 16, 2019

(65) Prior Publication Data

US 2020/0113215 A1 Apr. 16, 2020

Related U.S. Application Data

(63) Continuation of application No. PCT/IL2018/050664, filed on Jun. 14, 2018, and a continuation of application No. PCT/IL2018/050661, filed on Jun. 14, 2018.

(60) Provisional application No. 62/520,538, filed on Jun. 15, 2017.

(51) Int. Cl.
*A23L 27/20* (2016.01)
*A23L 27/30* (2016.01)
*A23L 33/26* (2016.01)
*A23L 33/105* (2016.01)

(52) U.S. Cl.
CPC ............ *A23L 27/206* (2016.08); *A23L 27/33* (2016.08); *A23L 33/105* (2016.08); *A23L 33/26* (2016.08); *A23V 2002/00* (2013.01)

(58) Field of Classification Search
CPC ........ A23L 27/206; A23L 27/33; A23L 33/26; A23L 33/105; A23V 2002/00
USPC ..................................................... 426/580
See application file for complete search history.

(56) References Cited

U.S. PATENT DOCUMENTS

| | | | | |
|---|---|---|---|---|
| 3,767,423 A | * | 10/1973 | Tsantir | ........... A21D 2/265 426/549 |
| 5,433,965 A | * | 7/1995 | Fischer | ........... A23L 2/02 426/639 |
| 8,367,137 B2 | | 2/2013 | Prakash et al. | |
| 2008/0226788 A1 | | 9/2008 | Chang et al. | |
| 2010/0178389 A1 | | 7/2010 | Jia et al. | |
| 2010/0267847 A1 | | 10/2010 | Yoshinaka et al. | |
| 2014/0010939 A1 | | 1/2014 | Krohn et al. | |
| 2015/0320823 A1 | | 11/2015 | Cho et al. | |
| 2016/0015064 A1 | | 1/2016 | Curran et al. | |
| 2016/0165941 A1 | | 6/2016 | Hofmekler | |

(Continued)

FOREIGN PATENT DOCUMENTS

RU 2583698 C1 * 5/2016
WO WO 2009/082476 A1 7/2009

(Continued)

OTHER PUBLICATIONS

Translation of RU-2583698-C1 (Year: 2016).*

(Continued)

*Primary Examiner* — Brent T O'Hern
(74) *Attorney, Agent, or Firm* — Pearl Cohen Zedek Latzer Baratz LLP

(57) ABSTRACT

The invention includes an all-natural dairy-based sugar substitute composition including a dairy-derived ingredient, a high-potency sweetening ingredient, and a flavor-balancing ingredient, and optionally including a grain hull ingredient, that can be used to replace sugar in any food, cosmetic, or pharmaceutical product.

18 Claims, 8 Drawing Sheets

(56) References Cited

U.S. PATENT DOCUMENTS

2017/0105432 A1    4/2017    Karanewsky et al.

FOREIGN PATENT DOCUMENTS

WO    WO 2016/097067 A1    6/2016
WO    WO 2018/229776 A1    12/2018

OTHER PUBLICATIONS

International Search Report of PCT Application No. PCT/IL2018/050661, dated Oct. 15, 2018.
International Search Report of PCT Application No. PCT/IL2018/050664, dated Oct. 15, 2018.
"Vanilla planifolia", Dec. 16, 2016, pp. 1-3. https://en.wikipedia.org/w/index.php?title=Vanilla_planifolia&oldid-755184159.
"Luo Han Guo (also known as Monk Fruit)", Jun. 13, 2017, pp. 1-4. http://www.sugar-and-sweetener-guide.com/luo-han-guo.html.
International Search Report of PCT Application No. PCT/US2019/058161, dated Jan. 13, 2020.

\* cited by examiner

DAIRY-BASED SUGAR SUBSTITUTE

CROSS REFERENCE TO RELATED APPLICATIONS

This application is a continuation of International Patent Application No. PCT/IL2018/050661, filed on Jun. 14, 2018, that claims the benefit under 35 U.S.C. § 119(e) of U.S. Provisional Patent Application No. 62/520,538, filed Jun. 15, 2017; and this application is also a continuation of International Patent Application No. PCT/IL2018/050664, filed on Jun. 14, 2018, that claims the benefit under 35 U.S.C. § 119(e) of U.S. Provisional Patent Application No. 62/520,538, filed on Jun. 15, 2017, all of which are hereby incorporated by reference.

BACKGROUND OF THE INVENTION

The present invention encompasses sugar substitutes and uses thereof, and more particularly, to a dairy-based sugar substitute with no artificial ingredients suitable for all uses. The present invention also encompasses sugar substitute compositions and uses thereof, such as a cane-sugar substitute with no artificial ingredients suitable for all uses.

BACKGROUND OF THE INVENTION

Sugar substitutes are natural and/or synthetic food additives that simulate the sweet taste effect of sugar. Sweet tastes of natural and synthetic high-potency sweeteners are slower in onset and longer in duration than the sweet taste produced by sugar and thus, change the taste balance of a food composition. Because of these differences, use of natural and synthetic high-potency sweeteners to replace a bulk sweetener, such as sugar, in a food or beverage, causes an unbalanced temporal profile and/or flavor profile. In addition to the difference in temporal profile, high-potency sweeteners generally exhibit lower maximal response than sugar, off tastes (e.g., bitter, metallic, cooling, astringent, and/or licorice-like taste), tongue and oral cavity numbing/tingling, and/or lingering sweetness that diminishes on iterative tasting. Some high potency sweeteners also exhibit dramatically different sweetness intensities as a function of temperature. It is well known to those skilled in the art of food/beverage formulation that changing the sweetener in a composition requires re-balancing of the flavor and other taste components. If the taste profile of natural and synthetic high-potency sweeteners could be modified to impart specific desired taste characteristics to be more sugar-like, the type and variety of compositions that may be prepared with that sweetener would be expanded significantly. Accordingly, it is desirable to selectively modify the taste characteristics of natural and synthetic high-potency sweeteners.

Artificial sweeteners are synthetic sugar substitutes that may be derived from naturally occurring substances. Artificial sweeteners, such as Aspartame™, Sucralose™, and Saccharin™ are common alternatives to sugar because much less sweetener material is required, as compared with the amount of sugar, to achieve the same level of sweetness. Since many artificial sweeteners have higher levels of sweetness than sugar, they often have a different taste than that of sugar, frequently having a bitter or chemical aftertaste. In addition to not tasting like sugar, some sweeteners are made with glycemic ingredients (such as maltodextrin) or synthetic additives (such as erythritol) or digestion disrupting sugar alcohols in an effort to resemble sugar. However, these artificial sweeteners still lack many of the properties and functions of sugar, not to mention their adverse effects, such as their laxative effect, which limit their use.

Additionally, artificial sweeteners have been linked to an increase in diabetes, metabolic disease, neurotoxicity, carcinogenicity, and obesity as they have also been shown to adversely affect human gut bacteria by specifically increasing the abundance of bacterial strains belonging to the *Bacteroides* genus and the Clostridiales order, both of which contain members linked to obesity, glucose intolerance, and opportunistic infections. In addition, artificial sweeteners are believed to interact with sweet taste receptors in the gut and cause an increase of the release of insulin in the body. In addition to disrupting an individual's blood sugar levels, increases in insulin release, can cause enlargement fat stores and general inflammation resulting in a variety of health issues, associated with obesity and diabetes. As a result, high-volume artificial sweeteners are of particular concern for individuals that already have conditions associated with elevated insulin or blood sugar levels. Thus, sugar substitutes derived from non-artificial ingredients have been proposed as healthier alternatives to artificial sweeteners.

Currently non artificial sugar substitutes may be derived from plants, fruit, vegetables, herbs, roots, and grains. However, these sugar substitutes, some of which claim to be derived from natural sources, such as Isomalt™, Stevia™, Truvia™, and Monatin™, still lack many of the properties, usability, and functions of sugar. Some of these sugar substitutes only about 40% and 60% of the sweetness of sugar and yield a notable bitter and metallic aftertaste, such as that of many Stevia™ extracts. Other natural sugar substitutes, such as Palatinose™, have a lower glycemic index than sugar, but provide the same amount of calories per gram as found in sugar. Some natural sugar substitutes, such as those containing non-synthetic sugar alcohols often cause laxative and bloating side effects and are therefore, limited for use to only a small serving per day. Also, many natural sugar substitutes use ingredients derived from genetically modified organisms (GMO) and do not include a fiber component whereas those sugar substitutes that do comprise soluble fiber, as a starting material, the fiber is often poorly soluble and/or produced from GMO ingredients.

Hitherto, commonly found natural sugar substitutes have used several ingredients, such as digestion resistant soluble fiber, Luo Han Guo extracts, and steviol glycosides, to replicate the various properties and characteristics of sugar. However, these attempts have not been successful in exactly replicating the properties and characteristics of sugar. As a result, these ingredients typically require a combination thereof with artificial ingredients, sugar alcohol, maltodextrin or sugar in order to simulate the taste of sugar.

Accordingly, there exists a need for a sugar substitute composition comprising non-artificial ingredients that can provide the added human health benefits and properties and characteristics of sugar, without the caloric content and glycemic impact of sugar and without causing adverse digestive side effects.

Sugar substitute compositions have natural ingredients that provide added human health benefits and properties and characteristics of sugar, without the caloric content and glycemic index of sugar. Unlike artificial sweeteners, sugar substitute compositions may not contain chemicals or synthetic additives and taste and function like sugar.

SUMMARY OF THE INVENTION

The invention encompasses a dairy sugar substitute having at least one dairy-derived ingredient in an amount of about 97% to about 99% by weight, at least one high-potency sweetening ingredient in an amount of about 0.8% to about 1.5% by weight, and at least one flavor-balancing ingredient in an amount of about 0.1% to about 1.2%. Optionally, the dairy sugar substitute may further include at least one grain hull ingredient. In an embodiment of the invention, the dairy-derived ingredient is at least one of dried low-fat milk, a dried whole milk, a dried whey protein, or a dried nonfat milk. In another embodiment, the high-potency sweetening ingredient is at least one of *siraitia grosvenorii* derived substance, a monk fruit extract having 25-55% mogroside v, a mogroside, esgoside, or a *Stevia rebaudiana* derived substance. In yet another embodiment of the dairy sugar substitute, the flavor-balancing ingredient is at least one of *Vanilla planifolia* derived substance, a natural vanillin, a citrus oil extract, or milk minerals. In one embodiment of the dairy sugar substitute, the grain hull ingredient is at least one of rice hulls, medium roasted peanut shells, barley hulls, wheat hulls, dried grounded corncob, or dried grounded sugar cane husks. In another embodiment of the dairy sugar substitute, the grain hull ingredient is in an amount of about 0.5% to about 2% by weight.

In yet another embodiment, the dairy sugar substitute may be substantially devoid of a sugar alcohol. In an embodiment, the dairy sugar substitute may be substantially devoid of an artificial or synthetic sweetener. In another embodiment, the dairy sugar substitute may be substantially devoid of a glycosides or substantially devoid of an isolated form of Rebaudioside A. In yet another embodiment, the dairy sugar substitute may have a glycemic response of about 35.

The invention also encompasses a process for preparing a dairy sugar substitute comprising mixing at least one dairy-derived ingredient, at least one high-potency sweetening ingredient, and at least one flavor-balancing ingredient to yield a mixture; and
heating mixture at a temperature of about 30° C. to about 120° C. for a time of about 30 minutes to about 0.5 minutes. In one embodiment, the process further comprises adding a grain hull ingredient either prior or after the heating step. In another embodiment, the heating step is performed in a dry oven. In yet another embodiment, the process further comprises adding water to the mixture to form a slurry prior to the heating step; and subjecting the slurry to spray drying or spray drying agglomeration.

The invention also encompasses a food product having the dairy sugar substitute. In one embodiment, the food product with the dairy sugar substitute may be substantially devoid of at least one of: (1) a sugar alcohol; (2) artificial or synthetic sweetener; or (3) a steviol glycoside, or any *Stevia rebaudiana*-derived substance or substantially devoid of an isolated form of Rebaudioside A. In another embodiment, the food product may induce a glycemic response in healthy humans lower than the glycemic response in the same healthy humans.

The invention also encompasses a sugar substitute composition having at least one indigestible fiber ingredient in an amount of about 93% to about 98% by weight, at least one high-potency sweetening ingredient in an amount of about 0.5% to about 2% by weight, at least one flavor-balancing ingredient in an amount of about 0.5% to about 2% by weight; and at least one grain hull ingredient in an amount of about 0.5% to about 2% by weight.

In an embodiment, in the sugar substitute composition the indigestible fiber ingredient is tapioca isomaltooligosaccharide; the high-potency sweetening ingredient is Luo-Han Guo extract; the flavor-balancing ingredient is vanillin; and the grain hull ingredient is rice hulls.

In an embodiment of the sugar substitute composition, the indigestible fiber ingredient is isomaltooligosaccharide, inulin, a digestive resistant dextrin, or a digestive resistant maltodextrin. In another embodiment, the high-potency sweetening ingredient is a *Siraitia grosvenorii* derived substance, Luo-Han Guo extract, a mogroside, or a esgoside. In yet another embodiment, the flavor-balancing ingredient is a *Vanilla planifolia* derived substance, a natural vanillin, or citrus oil extract. In an embodiment, the grain hull ingredient is rice hulls, medium roasted peanut shells, barley hulls, wheat hulls, dried grounded corncob, or dried grounded sugar cane husks.

In a particular embodiment of the sugar substitute composition, the tapioca isomaltooligosaccharide is present at about 97% by weight; the Luo-Han Guo extract is present at about 1% by weight; the vanillin is present at about 1% by weight; and the rice hulls are present at about 1% by weight. In another embodiment of the sugar substitute composition, the indigestible fiber ingredient is present in about 1% to about 85% by weight; the high-potency sweetening ingredient is present in about 3% to about 96% by weight; the flavor-balancing ingredient is present in about 2% to about 35% by weight; and the grain hull ingredient is present in about 2% to about 30% by weight.

The sugar substitute composition may be substantially devoid of at least one of (1) sugar alcohol; (2) an artificial or synthetic sweetener; or (3) a steviol glycoside, or any *Stevia rebaudiana*-derived substance. The sugar substitute composition may induce a glycemic response that is lower than the glycemic response induced by sucrose in healthy adult humans.

The sugar substitute composition may be packaged in a packaging material and identified in print for use as a sugar substitute. In an embodiment of the sugar substitute composition may have a mass and/or volume unit of the sugar substitute composition that is equivalent to the mass and/or volume unit of sugar.

The invention also encompasses a process for preparing the sugar substitute composition comprising blending at least one indigestible fiber ingredient, at least one high-potency sweetening ingredient, and at least one flavor-balancing ingredient to yield a mixture; heating the mixture; and mixing the grain hull ingredient to the mixture either prior or subsequent to the heating. In one embodiment, the heating is performed at a temperature of about 65° C. to about 120° C. for about 30 minutes to about 0.5 minutes. In another embodiment, heating step is performed in a dry oven. In yet another embodiment, the process further comprises mixing water to the mixture to obtain a slurry prior to the heating step; and subjecting the slurry to spray drying or spray drying agglomeration.

The invention also encompasses a food product having the sugar substitute composition. In one embodiment, the food product having the sugar substitute composition may be substantially devoid of at least one of (1) sugar alcohol; (2) an artificial or synthetic sweetener; or (3) a steviol glycoside, or any *Stevia rebaudiana*-derived substance. In another embodiment, the food product may have a glycemic index lower than that of sugar. In yet another embodiment, the food product can be a pastry product, a dairy product, a beverage, or a cooked product. The invention also encompasses a cosmetic or pharmaceutical composition having the sugar substitute composition.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

In FIG. 3A is the comparative spider diagram of the sensory profile is for butter cookies category comparing BTS101 to BTS90. FIG. 3B is the comparative spider diagram of the sensory profile is for sugar cookies category comparing BTS101 to sugar.

FIG. 4A is the comparative spider diagram of the sensory profile for chocolate cake category comparing BTS101 to BTS90. FIG. 4B is the comparative spider diagram of the sensory profile for chocolate cake category comparing BTS101 to sugar.

FIG. 5A is the comparative spider diagram for the sensory profile for cold coffee with milk category comparing BTS101 to BTS90. FIG. 5B is the comparative spider diagram for the sensory profile for cold coffee with milk category comparing BTS101 to sugar.

Figure 1:
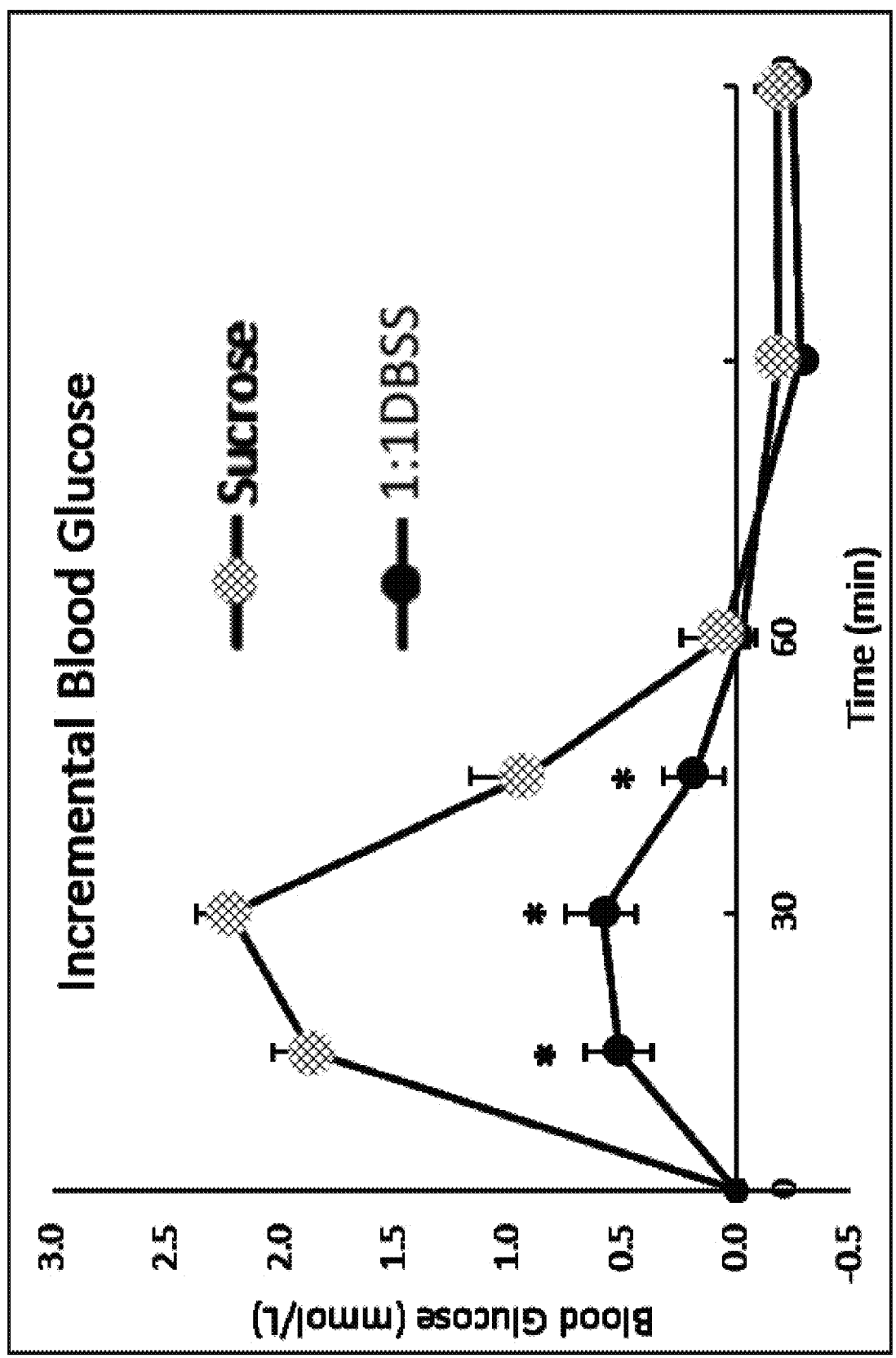
FIG. 1 illustrates the results of a glycemic response study recording postprandial glucose responses to 16.8 grams of sucrose, or to 13.2 grams of a dairy-based composition-pf-matter. The data are expressed as mean±SEM (significantly different from sucrose with p<0.001).

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. Well-known methods, procedures, and components have not been described in detail so as not to obscure the present invention.

The invention is directed to sugar substitutes and uses thereof, and more particularly, but not exclusively, to dairy-based sugar substitutes with non-artificial, non-GMO ingredients, and to a sugar substitute composition and their uses. As used herein, the term "synthetic" or "artificial ingredient" refers to food ingredients that are man-made that than extracted from plant, fungus, or animal sources.

The present invention includes an all-natural dairy sugar substitute having specific compositions of dairy and botanical components with distinct ratios therebetween that yield respective levels of sweetness, ranging from sucrose level to a level that is about thirty times sweeter than sucrose however, the dairy sugar substitute has a lower calorie content and a lower glycemic index than that of sucrose. Specifically, in some embodiments, the dairy sugar substitute composition comprises a dairy-based carrier/filler, a fruit or herbal sweetener component, a fruit or herbal flavor component ingredient, and an optional grain-hull derived ingredient for flavor balancing, all of which are preferably GRAS, and non-GMO, The dairy sugar substitute may be preferably devoid of maltodextrin, sugar alcohol, stevia Reb-A or any isolated stevia derivative, glycerin, and any known artificial sweetener.

The invention also is directed to a sugar substitute composition comprising specific compositions of botanical components with distinct ratios therebetween that yield respective levels of sweetness, ranging from sucrose level to a level that is about thirty times sweeter than sucrose, however with a lower calorie content and a lower glycemic index than that of sucrose. Specifically, in some embodiments, the sugar substitute composition comprises three botanical components: a soluble fiber carrier, a fruit or herbal sweetener ingredient, and a grain-hull derived ingredient for flavor balancing, all of which are preferably GRAS, and non-GMO. The sugar substitute composition may be preferably devoid of maltodextrin, sugar alcohol, stevia Reb-A or any isolated stevia derivative, glycerin, soy, milk, peanuts and wheat, and any known artificial sweetener.

The dairy sugar substitute or sugar substitute composition may comprise ingredients that would otherwise be excluded from the preferred composition but may be added due to, for example, common food processing methods. Such ingredients may include incidental additives in the manufacturing of the dairy-based and plant-based components of the dairy sugar substitute, incidental additives in the manufacturing of the botanical components of the sugar substitute composition or incidental additives that are present in the dairy-based and plant-based components with no technical function but are nevertheless present due to having been incorporated as an ingredient of another ingredient (such as a flavor for instance) where the additive substance have a function. Other examples of such ingredients may include processing aids that are often added during processing and may not have been fully removed, as well as otherwise excluded substances such as one or more of non-certified GRAS, non-certified non-GMO, maltodextrin, sugar alcohol, and glycerin, each of which individually or in combination with others may be incorporated and listed on the label as making up no more than 2% of the content of the composition.

The sugar substitute presented herein is nutritive in that each version provides protein and/or phytonutrients to the diet without causing adverse effects on gut flora such as those commonly associated with non-nutritive sweeteners. The sugar substitute composition presented herein is based on specific ratios between the high sweetening ingredient and the flavor balancing ingredient, each of which yields a specific level of sweetness while maintaining a clean taste with no bitter, metallic, cooling or licorice aftertaste such as that commonly associated with artificial sweeteners, stevia, sugar alcohol, allulose and Luo-Han Guo. It is the unique combination of properties—non-artificial ingredients, clean taste and range of sweetness, that confers the desired characteristic of the composition disclosed herein, which is distinctively unique compared to conventional sugar substitutes, as is capable of fully replacing natural sugar, such as cane sugar, and all types of sweeteners in all industrial and consumer recipes, particularly those of dairy products such as yogurt, ice cream and milk comprising powders, bars, and beverages without additional fillers or binders.

The combined properties of the dairy sugar substitute or sugar substitute composition may include: clean pleasant taste with no bitter, metallic, cooling, licorice, or lingering sweet aftertaste; sweetness range from 1 to 30 sucrose equivalents; clean label available in three ingredient versions derived from non-GMO plant-based and dairy-based sources; and optionally available in version substantially devoid of maltodextrin, sugar alcohol, isolated *Stevia rebaudiana* and derivatives thereof, soy, peanuts and wheat. The dairy sugar substitute or sugar substitute composition can replace sugar one-to-one in all consumer and industrial recipes without adding additional carriers, fillers or binder; may be available in versions with binding properties that can be useful in baking and chocolate manufacturing; and can replace chemical sweeteners, sugar alcohols and extracts comprising isolated *stevia* Rebaudioside A in all industrial recipes. Other properties of the dairy sugar substitute and sugar substitute composition may include one or more of least or non-laxative; prebiotic, supports healthy gut bacteria; available in diabetic friendly versions; nutritive, promotes satiety; high pH stability of 3-9 in some embodiments of the dairy sugar substitute and 2-9 for the sugar substitute composition and may reach 2-11 in other embodiments of both compositions; heat stability at 200-250° C. in some embodiments; and low moisture below 4.5%, or less for the dairy sugar substitute and low water activity ($a_w$) of 0.5 to 0.7 or less for the sugar substitute composition.

The invention pertains a sugar substitute composition having the visual appearance, texture, taste and usability of typical cane sugar, without sacrificing any of the desired properties of cane sugar. Not to be limited by theory, it was contemplated that chemical interactions between certain milk proteins and certain terpenoid glycosides, such as those found in Lou-Han Guo extracts and *stevia* extracts, may afford a sugar substitute composition-of-matter with improved sensory profile.

The invention includes a dairy sugar substitute comprising a sugar substitute based on three basic components: a dried dairy-derived ingredient, a high-potency sweetening ingredient, and a flavor-balancing ingredient. Optionally, the composition may also include a grain hull ingredient. It was surprisingly found that the inclusion of grain hulls afforded a product with unprecedented resemblance to cane sugar.

The method of preparing the diary sugar substitute contributed to the performance of the final product. Without being bound by any particular theory, it was assumed that the interaction between vanillin and Lou-Han Guo is possibly enhanced during the preparation due to interaction between the aldehydes group in the vanillin and the glycoside group in the Lou-Han Guo's mogrosides when the composition is in aqueous solution and heated. It is believed that the process causes conformational changes that reduce taste afternotes, (which would otherwise persist) and increases solubility. It is believed that the clean taste with few afternotes in the dairy sugar substitute compositions may have been in part due to vanillin-protein interaction which is likely enhanced due to the bonding affinity between the vanillin aldehyde and certain proteins in the whey components of milk, namely serum albumin and alpha lactalbumin. Whey is the second major component in milk protein.

As discussed above, the diary sugar substitute comprises at least one dairy-derived ingredient, at least one high-potency sweetening ingredient, and at least one flavor-balancing ingredient. Optionally, the composition may also include at least one grain hull ingredient.

The dairy-derived ingredient includes dried/powdered milk and/or derivatives of milk in a dry/powder form. Dried or powdered milk is a dairy product obtained by evaporating water from milk to dryness. As used herein, the term "dried milk" refers to milk that was dehydrated to about 5 percent of moisture by weight. Examples of dry milk include, but are not limited to, dried low fat milk, dried whole milk, dried nonfat milk, dried skim milk, dried buttermilk, dried whey products dried dairy blends, and combinations thereof.

In one instance, non-fat dried milk exhibited a stronger binding affinity to terpenoid glycosides and vanillin due to high protein content. Low- or non-fat dried milk have a higher content of naturally-occurring minerals, such as sodium and potassium that may contribute to the afternotes masking effect of the dairy ingredients, and exhibited a longer shelf-life due to lower fat content, which is associated with lower susceptibility to rate of oxidation and spoilage. Thus, in one embodiment, the dried or powdered milk is low-fat or non-fat dried milk.

Dried whole milk is an advantageous alternative for products such as chocolate or ice cream, where a whole milk component may yield more favorable organoleptic properties. Thus, in some embodiments, the dried milk or powdered milk is dried whole milk.

As used herein unless otherwise defines, the high-potency sweetening ingredient of the composition ("HPS") refers to any sweetener found in nature which may be in raw, extracted, purified, or any other form, singularly or in combination thereof and have a sweetness potency similar to, equal to or greater than sucrose, fructose, or glucose, and yet have less calories. Examples of high-potency sweetening ingredients include, but are not limited to, mogroside II, mogroside III, mogroside V, mogroside VI, isomogroside V, 11-oxomogroside, siamenoside, Luo Han Guo extract (having various concentrations of mogrosides), monatin and salts thereof (monatin SS, RR, RS, SR), curculin, glycyrrhizic acid and its salts, abiziasaponin, abrusosides, albiziasaponin, bayunosides, brazzein, bryoside, bryonoside, bryonodulcoside, carnosifloside, carrelame, cyanin, chlorogenic acid, cyclocarioside I, dihydroquercetin-3-acetate, dihydroflavenol, dulcoside A, dulcoside B, gaudichaudioside, glycyphyllin, gypenoside, hematoxylin, hernandulcin, lugduname, magap, miraculin, monellin, mabinlin, mukurozioside, naringin dihydrochalcone (NarDHC), osladin, periandrin I, pentadin, perillartine, phlomisoside I, phloridzin, phyllodulcin, polpodiosides, polypodoside A, pterocaryoside A, pterocaryoside B, rebaudioside A, rebaudioside B, rebaudioside C, rebaudioside D, rebaudioside E, rebaudioside F, rebaudioside M (sometimes referred to rebaudioside X), rubusoside, scandenoside, selligueanin A, sucronate, sucrooctate, telosmoside D-tryptophane thaumatin, trilobatin, *stevia*, stevioside, and combinations thereof.

Luo Han Guo extracts may have various concentrations of mogrosides, and it is also contemplated to include other luo Han Guo extract components. Monatin includes salts thereof (monatin SS, RR, RS, SR). Abrusosides include abrusoside A, abrusoside B, abrusoside C, and abrusoside D. Bayunosides include bayunoside 1 and bayunoside 2. Steviol glycoside extract components are also considered.

The high-potency sweetening ingredient preferably includes at least one of mogro side IV, mogroside V, Luo Han Guo extract, mixed steviol extract, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, bayunoside, osladin, polypodoside A, pterocaryoside A, pterocaryoside B, mukurozioside, phlomisoside I, periandrin I, abrusoside A, cyclocarioside I, modification or derivatives thereof, and a combination thereof.

In some embodiments of the invention, the high-potency sweetening ingredient is selected from the group consisting of a *Siraitia grosvenorii* derived substance, a monk fruit extract having 25-55% mogroside v, a mogroside, esgoside, and a *Stevia rebaudiana* derived substance.

High-potency sweetening ingredients may include modified natural HPSs ("NHPS"), which can include HPSs which have been altered naturally or synthetically. Modified NHPS include, but are not limited to, NHPSs that have been fermented, contacted with enzyme, or derivatized or substituted on the NHPS. For instance, the *stevia* glycosides can be *stevia* derived and/or produced through fermentation or enzymatic modification processes.

Most NHPSs alone have taste defects, e.g., lingering sweetness, bitterness, metallic taste, and the like. Artificial compounds such as aspartame, sucralose, acesulfame potassium, saccharin, cyclamate, and the like, have a late sweetness onset relative to sucrose, and significant taste defects including lingering sweetness, bitterness, metallic taste, and astringency. While also used as sugar reducers or replacers, they have been accepted by subsets of the population wishing to remove or significantly reduce sugar in their diets.

Alternatively, the high-potency sweetening ingredient may comprise a fruit and/or herbal derived extract. The fruit extract may comprise Luo Han Guo extract which is derived from the *Siraitia grosvenorii* plant comprising about 25-80% by weight of mogrosides, and particularly about 25% to 55% by weight of mogroside V. Mogrosides constitute a family of glycosides of cucurbitane derivatives or terpenoid glycoside phytonutrients, and include mogroside V (also referred to as mogroside 5), mogroside II $A_1$, mogroside II B, 7-oxomogroside II E, 11-oxomogroside $A_1$, mogroside III $A_2$, 11-deoxymogroside III, 11-oxomogroside IV A, 7-oxomogroside V, 11-oxo-mogroside V, and mogroside VI. The extract of such terpenoid glycoside phytonutrients is typically sweeter than sugar, it induces no glycemic response and has a low calorie content.

In another alternative, the high-potency sweetening ingredient is monk fruit extract. The monk fruit extract is a natural product extracted from *Siraitia grosvenorii* (luo Han Guo), and includes about 25% to about 95% by weight mogroside V. It may be 150-200 times as sweet as sugar. Monk fruit extract (synonymously used herein with Luo Han Guo extract) is also selected for being heat stable, non GMO, Kosher and GRAS certified. In addition, sweeteners made with monk fruit extract do not impact blood sugar levels, and carry substantially no calories. Unlike some artificial sweeteners, there is no evidence to date showing that monk fruit extracts have negative side effects, and they are recognized as safe for children, pregnant women, and breast-feeding women. Monk fruit extracts are available in liquid, granule, and powder forms.

One of the few drawbacks of many natural high-potency sweetening ingredients, including mogrosides and monk fruit extracts, is a notable aftertaste and lingering sweet when tasted alone. The diary sugar substitute solves this problem by combining the sweetening ingredient with the dairy-based ingredient and a flavor-balancing ingredient while catalyzing a pyrolytic process that eliminates the aftertaste of the sweetening ingredient.

The flavor-balancing ingredient of the composition may mitigate the aftertaste and undesired organoleptic response caused by the high potency sweeter. The flavor-balancing ingredient may comprise at least one of natural vanillin (may be derived from vanilla pods), clove, eugenol, nutmeg, cinnamon, turmeric, or citrus extract. The flavor-balancing ingredient may include combinations such as a combination of vanillin and other botanical ingredients; and/or a combination of citrus oil extract and other botanical ingredients.

In some embodiments, the citrus extract may comprise a 5-10 folded citrus oil extract that may be mixed with a single strength citrus oil extract in a ratio of 9 to 1 or similar ratios.

Other flavor-balancing ingredients include at least one of extracts or powders derived from ginger, cinnamon, pepper, allspice, nutmeg, rosemary, sage, thyme, oregano, rosemary, cardamom, chamomile, basil, bay leaf, banana, berries, *papaya*, melon, pineapple, coconut, cactus, peanuts, apple, pumpkin, carrot, beet, sweet potato, baobab, cassava, arrowroot, rice germ, rice bran, oat bran, lemon balm, lemon grass, cane sugar husk, pomegranate, acai, citrus, turmeric, coffee, cocoa, green tea, or black tea.

In some embodiments, the flavor-balancing ingredient is vanilla. The term "vanilla", as used herein, encompasses all sorts of vanilla flavoring products, such as natural vanillin derived from vanilla pods that is part of the vanilla orchid, vanilla extract, vanilla essence or any natural vanilla flavoring ingredient. It is noted herein that the vanilla-based flavor-balancing ingredient includes vanillin (4-hydroxy-3-methoxybenzaldehyde), which is characterized by an aldehyde functional group. Without being bound by any particular theory, it is assumed that the aldehyde functionality of vanillin interacts with certain functionalities found naturally in mogrosides and other terpenoid glycosides comprising compounds such as steviosides, whereas the product of such interaction confers the desirable taste-masking attribute to the composition-of-matter provided herein.

In general, vanillin should be preferably derived from botanical sources such as vanilla orchids, clove, turmeric, nutmeg, plant eugenol and sugar. Wood lignins, microbial vanillin and petroleum-based eugenols are less desirable sources.

In some embodiments of the invention, the flavor-balancing ingredient is selected from the group consisting of a *Vanilla planifolia* derived substance, a natural vanillin, a citrus oil extract, and milk minerals.

The grain hull ingredient includes cereal grain hulls that improve the desired sensory attributes of the resulting dairy sugar substitute. Cereal hulls or husks constitute the tough protective cover of the grain. It is noted herein that while grain bran is a byproduct obtained from the grain milling process, grain husk or grain hull is the grain's hard protecting cover. Both bran and hull are grain byproducts, which are often mistakenly considered to be the same, but are not.

The differences between rice bran and rice hulls are summarized in the table below:

| Rice product | Bran | Hulls |
| --- | --- | --- |
| Description | byproduct obtained from rice mills | outer covering of the rice grain |
| Definition | Bran is the hard outer layers of cereal grain. It consists of the combined aleurone and pericarp. Along with germ, it is an integral part of whole grains, and is often produced as a by-product of milling in the production of refined grains. | Rice hulls are the hard protecting coverings of grains of rice. In addition to protecting rice during the growing season, rice hulls can be put to use as building material, fertilizer, insulation material, or fuel. |
| Also known as: | miller's bran | rice husks |
| Consumption | can be digested by humans and cattle | cannot be digested by humans |

The grain hull ingredient includes any type of cereal hull. In particular, the grain hull ingredient includes, but is not limited to, rice hulls, oat hulls, wheat hulls, barley hulls and the likes. In a particular preference, the grain hull ingredient is rice hull. In some embodiments of the invention, the grain hull ingredient is selected from the group consisting of rice hulls, medium roasted peanut shells, barley hulls, wheat hulls, dried grounded corncob, and dried grounded sugar cane husks.

Rice husks or rice hulls are the tough protective covers of the rice grain. The husks or hull is formed during the growing season, and include opaline silica hemicellulose and lignin content. The hull or husk are digestive resistant fibers is mostly indigestible to humans; hence, these are typically used in the vermicomposting techniques wherein these husks are converted into fertilizers. Mostly, the husks are used for building material, insulation material, paper milling, and fuel purposes.

Though both, rice bran and husk are similar in structure and nature, they differ in their properties. Rice bran and its products can be digested by human, while rice husk product cannot.

Rice hulls were found to impart desired organoleptic properties to the dairy sugar substitute similar to those of evaporated cane sugar juice. This effect may relate to the hull's composition which resembles that of sugar cane boagasse (husk). Both rice hulls and sugar cane boagasse comprise cellulose, hemicellulose, lignins and silica, which seem to contribute to the similarity between their organoleptic features. Rice hulls have never been used as a flavoring agent, neither was it ever discovered to function as such in sugar substitutes or any nutritional product.

Sucrose exhibits a sweet taste with a quickly perceived maximal response and a relatively quick to disappear sweetness upon tasting a sugar sweetened food or beverage. In contrast, the sweet taste of essentially all high-potency sweeteners reaches their maximal responses than that of sucrose and it declines in intensity more slowly than is the case for sucrose. This decline in sweetness is often referred to as "sweetness linger" and is a major limitation for high-potency sweeteners, and so is the slow onset of sweetness.

Sucrose is not known to exhibit any bitterness or mouth/tongue coating, or numbing/tingling effect; all of these attributes are considered problematic, negative sensory effects, or "taste defects", particularly those of lingering or intensifying nature.

NHPSs such as monk fruit extract and *stevia* and other high potency sweeteners are known to have a number of taste defects and reduced sweetening power (maximum achievable sweetness intensity) relative to sugars and other high potency sweeteners, including delayed sweetness onset, bitterness, soapy taste, lingering sweetness, carryover sweetness, and recurring sweetness. In addition, a typical NHPS has a distinct sensory defect in that, in some subjects and in some instances, it leaves the tongue and overall oral cavity with a sticky, coated feeling and sometimes a numb sensation on the tongue that only subsides after significant water or other food exposure. In extreme cases, sweetness linger can last for more than 15 minutes. In extreme cases, minutes are required before the full sensation of the tongue returns. NHPSs are currently and most commonly used as sugar reduction tools and can work acceptably in products that contain some level of sugars or sugar alcohols. However, in order for NHPSs to be used to provide even more and eventually all of the sweetness in many consumer products, significant progress must be made to modify their taste profile, temporal profile and adaptive behaviors.

Particular dairy sugar substitutes comprise at least one dried milk ingredient present in an amount of about 99% to about 97 wt. %; at least one high potency sweetening ingredient present in an amount of about 0.8% to about 1.5 wt. %; and a flavor-balancing ingredient present in an amount of about 0.1% to about 1.2 wt. %. Optionally, the dairy sugar substitute may include a grain hull ingredient present in an amount of about 0.5% to about 2 wt. %.

Another particular dairy sugar substitute as a high-volume sweetener substitute comprises at least one dried milk ingredient present in an amount of about 5% to about 25 wt. %; at least one high potency sweetening ingredient present in an amount of about 2% to about 70 wt. %; and a flavor-balancing ingredient present in an amount of about 1 to about 20 wt. %. Optionally, the high-volume sweetener substitute may include a grain hull ingredient.

The sugar substitute composition comprises an indigestible fiber ingredient, a high-potency sweetening ingredient, a flavor-balancing ingredient; and a grain hull ingredient. The high potency sweetening ingredient, flavor-balancing ingredient, and grain hull ingredient are described above.

The indigestible fiber ingredient includes at least one of isomaltooligosaccharide, an inulin, a digestive resistant dextrin, or a digestive resistant maltodextrin. In a particular embodiment, the high-potency sweetening ingredient is selected from the group consisting of a *Siraitia grosvenorii* derived substance, a Luo-Han Guo extract, a mogroside and esgoside; the flavor-balancing ingredient is selected from the group consisting of a *Vanilla planifolia* derived substance, a natural vanillin and a citrus oil extract; and the grain hull ingredient includes rice hulls, medium roasted peanut shells, barley hulls, wheat hulls, dried grounded corncob and dried grounded sugar cane husks.

The sugar substitute composition includes a indigestible or digestive resistant (both terms used interchangeably) fiber ingredient. The indigestible fiber ingredient includes isomaltooligosaccharide, or IMO. As used herein unless otherwise stated, IMO is a mixture of short-chain carbohydrates with a DP (degree of polymerization) of 2-4 that constitute a matrix of glucose oligomers (oligosaccharides) having $\alpha$-D-(1,6) linkage ("iso" linkage) of various chain length, ranging from 2 to 9 saccharides linked together. IMO is digestion-resistant, namely a mixture of dietary saccharides that are ingestible yet indigestible; thus, ingestion of IMO is likely to contribute to lower caloric value of foods, and induce a low glycemic response in a subject (35±8 on a scale of 1-100) when compared to the food same items made with sugar. In general, a glycemic response refers to the changes in blood glucose after consuming/ingesting a carbohydrate-containing food, unlike available carbohydrates that are actually digested and absorbed into the blood, metabolized and induce a high glycemic response (>50 on a scale of 1-100).

IMOs are found naturally in all plants, and the raw material used for manufacturing IMO is typically starch, which is enzymatically converted into a mixture of isomaltooligosaccharides. The IMO may be a GRAS (Generally Recognized As Safe) food ingredient, which is afforded from crops like acacia, tapioca, corn, milk, banana, pulses (peas, beans, lentils), rice, potato and the likes. Alternatively, the indigestible fiber ingredient may be IMO produced from corn, potato, acacia and/or tapioca.

It is contemplated that IMO can be replaced by an inulin as an indigestible fiber ingredient. Inulins constitute a group of naturally occurring fructose oligosaccharides produced by many types of plants, and are most often extracted from chicory or Jerusalem artichoke. Because of the $\beta(2,1)$ linkages, inulins are not digested by enzymes in the human alimentary system, contributing to its functional properties: reduced calorie value, dietary fiber and prebiotic effects. Thus, inulins belong to a class of dietary fibers known as fructans, and are considered as indigestible fiber ingredient in the context of embodiments of the present invention. Inulin is used by some plants as a means of storing energy and is typically found in roots or rhizomes, and most plants that synthesize and store inulin do not store other forms of carbohydrate such as starch.

Alternatively and/or additionally, the indigestible fiber ingredient may include digestive resistant dextrin and digestive resistant maltodextrin.

The indigestible fiber ingredient may further include cellulose (e.g., from plants) and/or pectin (e.g., from apples) and/or IMO varieties derived from, for example, potato, pumpkin or banana, and in some cases also milk.

In a particular embodiment, the sugar substitute composition comprises indigestible fiber ingredient in an amount of about 93% to about 98% by weight; the high-potency sweetening ingredient is present in an amount of about 0.5% to about 2% by weight; the flavor-balancing ingredient is present in an amount of about 0.5% to about 2% by weight; and the grain hull ingredient is present in an amount of about 0.5% to about 2% by weight of the composition.

In a particular embodiment, the sugar substitute composition has an indigestible fiber ingredient that is tapioca isomaltooligosaccharide; a high-potency sweetening ingredient that is luo-Han Guo extract; a flavor-balancing ingredient that is natural vanillin; and a grain hull ingredient that is rice hulls. In a particular embodiment, the sugar substitute composition comprises tapioca isomaltooligosaccharide present in an amount of about 97% by weight; luo-Han Guo extract present in an amount of about 1% by weight; natural vanillin present in an amount of about 1% by weight; and rice hulls present in an amount of about 1% by weight of the composition.

The sugar substitute composition may comprise indigestible fiber ingredient in an amount of about 1% to about 85% by weight; high-potency sweetening ingredient in an amount of about 3% to about 96% by weight; flavor-balancing ingredient in an amount of about 2% to about 35% by weight; and grain hull ingredient in an amount of about 2% to about 30% by weight of the composition.

The sugar substitute composition may comprise indigestible fiber in an amount of about 3% to about 30% by weight; high-potency sweetening ingredient in an amount of about 55% to about 75% by weight; flavor-balancing ingredient in an amount of about 5% to about 33% by weight; and grain hull ingredient in an amount of about 5% to about 10% by weight of the composition.

The dairy sugar substitutes may be a standalone dry powdered or granulated tabletop product, which may be used as a complete replacement of sugar in all home and industrial applications and uses, and can overcome the taste limitations associated with natural high-potency sweetener. The dairy sugar substitutes exhibit significant improvement in taste quality and have a temporal profile more similar to a sugar temporal profiles.

As used herein, "temporal profile" of a composition means the onset and intensity of sweetness perceived over time in tasting of a composition by a human.

The dairy sugar substitute or sugar substitute composition may exhibit a cane sugar-like temporal and/or sugar-like flavor profile by including a grain hull ingredient. The incorporation of grain hull improves the taste profile and suppresses, reduces, or eliminates one or more of the undesirable taste defects of natural high-potency sweeteners and impart sugar-like characteristics.

Some embodiments of the present invention provide methods for suppressing, reducing, or eliminating taste defects of a NHPS and impart sugar-like characteristics by including rice hulls in composition including the NHPS to form the composition-of-matter presented herein.

As used herein unless otherwise define, the terms "sugar-like characteristic," "sugar-like taste," "sugar-like sweet," "sugary," and/or "sugar-like" are synonymous and are used interchangeably. Sugar-like characteristics include any characteristic similar to that of sucrose including, but are not limited to, maximal response, flavor profile, temporal profile, adaptation behavior, mouthfeel, concentration/response function behavior, tastant (any substance that stimulates the sense of taste) and flavor/sweet taste interactions, spatial pattern selectivity, and temperature effects. These characteristics are dimensions in which the taste of sucrose is different from the tastes of natural and synthetic high-potency sweeteners. Whether or not a characteristic is more sugar-like is determined by expert sensory panel assessments of sugar, whereas such assessments quantify similarities or differences of the characteristics of a composition with those comprising sugar. Suitable procedures for determining whether a composition has a more sugar-like taste are well known in the art.

The Examples section include methods to determine the characteristics of dairy sugar substitute or sugar substitute attributed to the ingredients and specific balance therebetween, namely to the weight ratio of their content in the composition, and the process/method of preparing the same.

In general, unless specified otherwise, all ingredients are in a dry form, at least for the relative amount consideration, which is discussed in terms of weight percentage relative to the total weight of the composition. In some embodiments, one or more of the ingredients may be a liquid, a syrup, or a concentrated solution, and the amounts thereof refer to the weight percentage of the liquid, or to the total dissolved solid in the syrup/solution assuming the solvent is milk, water or alcohol and that the solvent is releasable.

As demonstrated below, the composition-of-matter presented herein can be formulated to afford a product that resembles cane sugar in its sweetness, consistency and usability (functions); this particular embodiment of referred to herein as "sugar level substitute", "sucrose level substitute", or a one-to-one sugar substitute.

Alternatively and additionally, the composition-of-matter presented herein can be in a form having a high-volume sweetness equivalent of up to approximately 30-times sugar (sucrose) level. These embodiments are referred to herein as "high-volume sweetener substitute."

Alternatively, the dairy sugar substitute or sugar substitute composition is substantially devoid of a sugar alcohol and/or is substantially devoid of an artificial or synthetic sweetener. In another alternative, the dairy sugar substitute or sugar substitute composition is substantially devoid of isolated steviol glycosides including an isolated form of Rebaudioside A.

The dairy sugar substitute or sugar substitute composition is characterized by inducing a glycemic response that is significantly lower than that induced by sugar in healthy human subjects. The glycemic response may be a glycemic index lower than 35.

It is to be understood that embodiments of the present invention encompass compositions-of-matter having all intermediate values of ingredients' contents, namely compositions-of-matter that are twice as sweet as sugar, 5-times, 10-times, 15-times, 20-times, 25-times, 30-times, 40-times and 50-times sweeter than sugar, wherein the ratio of the ingredients is maintained according to an interpolation between the "sugar level substitute" and the "high-volume sweetener" embodiments. For example, the ratio of the flavor-balancing ingredient and the HPS ingredient is kept at 1:10, the optional grain hull ingredient is kept at a level between 1× to 2× of the NHPS ingredient weight, and the dried milk ingredient makes up to Q.S. of 100 wt. %.

The compositions can be supplemented with various optional and additional ingredients, which are used to confer particular properties to the composition-of-matter, such as flavoring agents, grain hulls and plant fiber or husks (e.g., rice hulls), salts, thickeners, anticaking agent, and coloring agents. Such optional ingredients are selected and quantified so as not to augment the desired flavor and functionality of the composition.

According to some embodiments, the composition-of-matter presented herein is substantially devoid of an artificial or synthetic sweetener. As used herein, the phrase "artificial or synthetic sweetener" refers to any substance that is not found in nature and characteristically have a sweetness potency greater than sucrose, fructose, or glucose, yet have less calories. Non-limiting examples of artificial or synthetic sweeteners relevant in the context of embodiments of the present invention include, without limitation, advantame, sucralose, potassium acesulfame, aspartame, alitame, saccharin, cyclamate, neotame, N—[N-[3-(3-hydroxy-4-methoxyphenyl)propyl]-L-α-aspartyl]-L-phenylalanine 1-methyl ester, N—[N-[3-(3-hydroxy-4-methoxyphenyl)-3-methylbutyl]-L-α-aspartyl]-L-phenylalanine 1-methyl ester, N—[N-[3-(3-methoxy-4-hydroxyphenyl)propyl]-L-α-aspartyl]-L-phenylalanine 1-methyl ester, salts thereof, and the like.

According to some embodiments, the dairy sugar substitute or sugar substitute composition is essentially devoid of a sugar alcohol, and more specifically, essentially devoid of sugar alcohol having 3-30 carbon atoms. Common sugar alcohols include, ethylene glycol (2-carbon), glycerol/glycerine (3-carbon), erythritol (4-carbon), threitol (4-carbon), arabitol (5-carbon), xylitol (5-carbon), ribitol (5-carbon), mannitol (6-carbon), sorbitol (6-carbon), galactitol (6-carbon), fucitol (6-carbon), iditol (6-carbon), inositol (6-carbon; a cyclic sugar alcohol), volemitol (7-carbon), isomalt (12-carbon), maltitol (12-carbon), lactitol (12-carbon), maltotriitol (18-carbon), and maltotetraitol (24-carbon).

According to some embodiments, the composition-of-matter presented herein is essentially devoid of any *stevia* derivative, stevioside, or other steviol glycoside extract components, including any natural, modified, derivative or a synthetic form thereof. In some embodiments, the high-potency sweetening ingredient is not selected from at least one of steviolbioside, stevioside, rebaudioside A, rebaudioside B, rebaudioside C, rebaudioside D, rebaudioside E, rebaudioside F, rebaudioside M/X, rubusoside, dulcoside A, dulcoside B, or combinations thereof.

In a particular embodiment, the dairy sugar substitute comprises dried milk, Luo-Han Guo extract, and natural vanillin. Optionally, the dairy sugar substitute includes grain hulls, in particular rice hulls.

According to an embodiment of the present invention, the dairy sugar substitute comprises a dairy-derived ingredient in an amount of about 97% to about 99 wt. %, a high-potency sweetening ingredient in an amount of about 0.8% to about 1.5 wt. %, and a flavor-balancing ingredient in an amount of about 0.1% to about 1.2 wt. %. Optionally, the dairy sugar substitute includes rice hulls in an amount of about 0.5-2.0 wt. % of the total weight of the composition. In a singular embodiment, the dairy sugar substitute comprises low fat dried milk, a natural high-potency sweetening ingredient that is 30-50MV Luo-Han Guo extract, and the flavor-balancing ingredient is natural vanillin.

The process for making the dairy sugar substitute is described as follows. Not to be limited by theory, it is believed that terpenoid glycosides, such as those found in Lou-Han Guo-based and *stevia* NHPSs, and aldehydes, such as those found in many flavor-balancing ingredients such as vanillin, are polar molecules with lipophilic/hydrophilic tale ends that have a tendency to interact with each other, and further interact with milk component, especially milk and whey proteins, and form a matrix in a process that may be catalyzed by exposure to heat and/or process of wetting and spraying.

Indeed, it was found that dry heating (baking) the mixtures of the ingredients contributes to the elimination of taste defects (afternotes), possibly due to the heat effect on the proteins, terpenoid glycosides and aldehydes, as well as on the removal of microbial oxidants and reduction of oxidized material which generally elicit bitter and astringent notes to degraded foodstuff. The same holds truth for spray drying protocols, which involve wetting and heating as part thereof.

It was found that a mixture comprising proteins, terpenoids glycosides and aldehyde, once exposed to a process of wetting and drying under certain temperatures for a certain time range, forms a matrix with improved solubility and improved taste profile. It was further noticed that improvements in taste and function correlates with specific ratios between heating temperature and heating duration.

In one process, the dairy sugar substitute can be made by spray drying, wherein the dairy sugar substitute is prepared by first mixing the high potency sweetening ingredient with the flavor-balancing ingredient, and thereafter mixing in the dried milk ingredient. Add the resulting mixture to water to afford a liquid slurry preferably having about 20% dissolved/suspended solids, ready for spray drying/agglomeration under a temperature range of about 30-93° C., through a single or two steps protocol until yielding a dry product. Optionally, grain hulls can be added to the dry product at a preferred concentration to afford the dairy sugar substitute composition. Alternatively, the liquid slurry can be dried in an open tray using a standard convection oven set to about 65° C. for about 5-30 minutes; or about 82° C. for about 1-10 or about 1-5 minutes; or about 120° C. for about 0.5-3 or about 0.5-1 minutes.

The process for preparing the dairy sugar substitute includes admixing a dairy-derived ingredient, a natural high-potency sweetening ingredient, and a flavor-balancing ingredient to thereby afford a mixture; and heating the mixture. The process may further include, subsequent or prior to the heating, blending the mixture with a grain hull ingredient. The heating may be performed at a temperature ranging from about 30° C. to about 120° C. for a time period that ranges from about 30 minutes to about 0.5 minutes, respectively. The heating may be conducted by a dry oven. Alternatively, prior to the heating, the mixture is mixed with water to obtain a slurry; and subjecting the slurry to spray drying (agglomeration/granulation).

A process for making the sugar substitute composition comprises blending the indigestible fiber ingredient, the natural high-potency sweetening ingredient, and the flavor-balancing ingredient to thereby afford a mixture; heating the mixture; and admixing the grain hull ingredient to the mixture, wherein admixing the grain hull ingredient to the above mixture may be prior to or subsequent to the heating step. The heating step is performed at a temperature of about 65° C. to about 120° C. for a time period of about 30 minutes to about 0.5 minutes, respectively.

In general, the dairy sugar substitute or sugar substitute composition can replace sugar in all food product categories, including tabletop products, cooking, baked goods, sweets, hot or cold drinks, dairy products, and the likes. It is noted that the dairy sugar substitute or sugar substitute composition can replace sugar in a food product, while the food product is essentially devoid of any added sugars, devoid of any added sugar alcohols, or devoid of any added artificial or synthetic sweeteners.

While serving as a total sugar substitute, the dairy sugar substitute or sugar substitute composition is capable of affording food products that are suitable for consumptions by subject that should be under a sugar-restrictive (low sugar) diet. As such, the dairy sugar substitute or sugar substitute composition is characterized by inducing a low glycemic response. The combination of sugar-like properties and the low glycemic response induced in humans, renders the dairy sugar substitute or sugar substitute composition as an advantageous sugar substitute compared to all presently known sugar substitute products.

The dairy sugar substitute or sugar substitute composition can be used in beverages, broths, and beverage preparations. In some embodiments, the dairy sugar substitute or sugar substitute composition can be used in food products such as carbonated, non-carbonated, frozen, semi-frozen ("slush"), non-frozen, ready-to-drink, concentrated (powdered, frozen, or syrup), dairy, non-dairy, herbal, non-herbal, caffeinated, non-caffeinated, alcoholic, non-alcoholic, flavored, non-flavored, vegetable-based, fruit-based, root/tuber/corn-based, nut-based, other plant-based, cola-based, chocolate-based, meat-based, seafood-based, other animal-based, algae-based, calorie enhanced, calorie-reduced, and calorie-free products. The amount of dairy sugar substitute or sugar substitute composition in the food product can vary depending on the desired sweetness and other characteristics of the product. When used with liquid products, the dairy sugar substitute or sugar substitute composition is mixed with water, carbonated, or non-carbonated water.

The dairy sugar substitute or sugar substitute composition can be used in foods and food preparations (e.g., sweeteners, soups, sauces, flavorings, spices, oils, fats, and condiments) from dairy-based, cereal-based, baked goods, vegetable-based, fruit-based, root/tuber/corn-based, nut-based, other plant-based, egg-based, meat-based, seafood-based, other animal-based, algae-based, processed (e.g., spreads), preserved (e.g., meals-ready-to-eat rations), and synthesized (e.g., gels) products. The amount of the dairy sugar substitute or sugar substitute composition can vary depending on the desired sweetness and other characteristics of the product.

The dairy sugar substitute or sugar substitute composition can be used in candies, confections, desserts, and snacks such as dairy-based, cereal-based, baked, vegetable-based, fruit based, root/tuber/corn-based, nut-based, gum-based, other plant-based, egg-based, meat-based, seafood-based other animal-based, algae-based, processed (e.g., spread), preserved (e.g., meals-ready-to-eat rations), and synthesized (e.g., gels) products. The amount of the dairy sugar substitute or sugar substitute composition can vary depending on the desired sweetness and other characteristics of the product.

The dairy sugar substitute or sugar substitute composition may be used in bread, cakes, cookies, pastries and other baked goods, yogurt, coffee beverage, tea beverages, cocoa beverages, ice-cream and soft drinks.

The dairy sugar substitute or sugar substitute composition may be used in prescription and over-the-counter pharmaceuticals, assays, diagnostic kits, and therapies. The dairy sugar substitute or sugar substitute composition can be used in weight control products, nutritional supplement, vitamins, infant diet, diabetic diet, athlete diet, geriatric diet, low carbohydrate diet, low fat diet, low protein diet, high carbohydrate diet, high fat diet, high protein diet, low calorie diet, non-caloric diet, oral hygiene products (e.g., toothpaste, mouthwash, rinses, floss, toothbrushes, other implements), personal care products (e.g., soaps, shampoos, rinses, lotions, balms, salves, ointments, paper goods, perfumes, lipstick, other cosmetics), professional dentistry products in which taste or smell is a factor (e.g., liquids, chewables, inhalables, injectables, salves, resins, rinses, pads, floss, implements), medical, veterinarian, and surgical products in which taste or smell is a factor (e.g., liquids, chewables, inhalables, injectables, salves, resins, rinses, pads, floss, implements), and pharmaceutical compounding fillers, syrups, capsules, gels, and coating products. The amount of dairy sugar substitute or sugar substitute composition can vary depending on the desired sweetness and other characteristics of the product, so the amount can be adjusted accordingly.

The dairy sugar substitute or sugar substitute composition can be used in goods including table top sweeteners, sweeteners, co-sweeteners, coated sweetener sticks, creamers, frozen confection sticks, medicine spoons (human and veterinary uses), dental instruments, pre-sweetened disposable tableware and utensils sachets edible sachets potpourris, edible potpourris, artificial flowers, edible artificial flowers, clothing, edible clothing, massage oils, and edible massage oils. The amount of dairy sugar substitute or sugar substitute composition can vary depending on the desired sweetness and other characteristics of the product.

The dairy sugar substitute or sugar substitute composition when used as a tabletop composition can optionally include bulking agent or anticaking agent or flow agent. The tabletop composition can be packaged in numerous different forms and it is intended that the tabletop composition may be of any form known in the art. The tabletop composition can be in the form of a fine powder, a coarse powder, a granular form, packets, tablets, sachets, pellets, cubes, solids, and liquids (e.g., the composition-of-matter presented herein is included in a liquid carrier).

The dairy sugar substitute or sugar substitute composition may be a liquid product with properties such that it can be sold commercially. The dairy sugar substitute or sugar substitute composition as a liquid composition may be dried through a variety of techniques known to those skilled in the art including spray drying, freeze drying and vacuum drying, and foam-mat drying, stored for up to 3 years, then re-distributed into a food product such that the original taste characteristic of the liquid product is maintained.

It is expected that during the life of a patent maturing from this application many relevant variants of the sugar substitute presented herein will be developed and the scope of the terms "sugar substitute" and/or "cane-sugar substitute" are intended to include all such new technologies a priori.

As used herein the term "about" refers to ±10%.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The words "optionally" or "alternatively" are used herein to mean "is provided in some embodiments and not provided in other embodiments." Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

EXAMPLES

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Example 1

Materials:

Spray dried Extra grade nonfat dry milk (NDM) was obtained from local suppliers, such as California Dairies, Inc., Visalia, Calif., USA. Max. fat 1.25%, max. moisture 4%, max. titratable acidity 0.15%, max. solubility index 1.2-2 ml, and max. scorched particles 15 mg.

Lou-Han Guo (Monk fruit) extract was obtained from Monk Fruit Corp's Fruit-Sweetness™ monk fruit extract division (MFC-E30P). Botanical source: *Siraitia grosvenorii*.

Natural vanillin was obtained from FoodArom™, (MET0000723). Botanical source: *Syzygium aromaticum* (clove).

Rice hull was obtained from RIBUS Inc., St. Louis, Mo., USA (Nu-FLOW®), marketed as a natural, free-flowing, fine powder used to replace silica (silicon dioxide, a synthetic anticaking agent) as an anticaking agent or as a flavor carrier. Particle size 200 mesh screen (74 micron). Nu-FLOW® is natural and organic and made from 100% rice hulls that have been ground, steam sterilized, sifted and packaged; nothing is added and nothing is removed from the hulls; no enzymes, chemicals, solvents, extraction nor any other processes have been used in the manufacturing of Nu-FLOW® except as described herein. Botanical source: *Oryza sativa*.

Basic dairy-based sugar substitute was made by mixing Non-fat dry milk powder was used as a dairy-derived ingredient, at a concentration of about 98.5-97.5 wt. %; Lou-Han Guo 30MV (30% mogroside V) or Lou-Han Guo 25MV (25% mogroside V) was used as a natural high-potency sweetening ingredient at a concentration of 0.8-1 wt. %; and Natural vanillin was used as a flavor-balancing ingredient at a concentration of 0.2-1.2 wt. %. These ingredients were mixed together to yield a powdered end product Alternatively, the ingredients were mixed together, turned into a liquid slurry with water, and subjected to spray-drying protocol to afford an agglomerated/granulated composition-of-matter that was used as a one-to-one to replace sugar in a variety of applications.

Cane-sugar-like dairy-based (one-to-one) sugar substitute was made by mixing: Non-fat dry milk powder was used as a dairy-derived ingredient, at a concentration of about 98.5-96.5 wt. %; Lou-Han Guo 30MV (30% mogroside V) or Lou-Han Guo 25MV (25% mogroside V) was used as a natural high-potency sweetening ingredient at a concentration of 0.8-1 wt. %; Natural vanillin was used as a flavor-balancing ingredient at a concentration of 0.8-1.2 wt. %; and Rice hull powder was used as a grain hull ingredient at a concentration of about 1 wt. % of the total weight of the composition. The ingredients were mixed together to yield a powdered end product.

Alternatively, the ingredients with the rice hull powder were mixed together, turned into a liquid slurry with water, and subjected to spray-drying protocol to afford a granulated composition-of-matter that was used as a one-to-one to replace cane sugar in a variety of applications.

Spray drying preparation process: The liquid slurry was spray dried alone or over a bed of acacia gum and/or cellulose under a temperature threshold ranging about 65-93° C., until yielding a dry composition. The spray-dried composition was mixed with rice hulls thereafter to afford the final composition-of-matter. Alternatively, the optional rice hull ingredient was added to the slurry, which was thereafter subjected to spray-drying.

The spray drying temperature was carefully adjusted to prevent formation of scorch particles. Though initial experiments have shown that spray drying under 120° C. can yield a viable product, a slower drying process utilizing a lower temperature range of 65-93° C. have shown to yield more desirable end products with lower scorch/ash content.

Example 2

Glycemic response validation Study. The study was conducted at the GI Labs facilities (Toronto, Ontario, Canada). Briefly, the study compared the relative glycemic response of the dairy sugar substitute of the invention with sucrose as postprandial glycemic response of the "one-to-one" embodiment compared to sucrose. The dose of the one-to-one dairy-based sugar substitute (1:1DBSS) formulated and denoted 1:1DBSS was matched for sweetness with that of sucrose (4 tsps).

Background: The prevalence of impaired glucose tolerance and diabetes is increasing exponentially with a current estimated prevalence of 13% worldwide. At the same time, obesity rates have also been climbing to epidemic levels. Changes in lifestyle factors have generally been blamed for these effects, which have resulted in a renewed focus on modifications in diet and exercise patterns, and the extent to which they can affect change. The quality and quantity of carbohydrate has emerged as possible loci of interest to address some of the problems associated with increased rates of obesity. The rate of glucose absorption and extent and duration of the glycemic response induce hormonal and metabolic changes that may affect health or disease parameters. Increased focus on controlling blood sugar levels is not limited to the medical community and consumer interest in the use of dietary supplements to maintain healthy blood sugar levels has seen incremental growth. The use of novel sweeteners is one approach to modulate postprandial glucose levels. In addition to the sweeteners such as sucralose, aspartame and a variety of sugar alcohols, and now also *Stevia*, erythritol, isomaltulose, monk fruit, and tagatose, among others, on the market. The dairy-based composition-of-matter provided herein is a sugar substitute (sweetener), which has a minimal effect on postprandial glucose levels and little or no gastrointestinal side effects. This study compared the postprandial glycemia of the dairy based composition-of-matter with the substance it is intended to replace: sucrose.

Study Objectives:
1. Compare the incremental area under the glucose curve (IAUC) of the dairy sugar substitute with that of sucrose.
2. Calculate the % difference in IAUC of 1:1DBSS compared with sucrose.

Inclusion criteria: Subjects were males or non-pregnant females aged 18-75 years and in good health.

Exclusion and withdrawal criteria included: Subject less than 18 years old or older than 75 years; with a known history of AIDS, hepatitis, diabetes or a heart condition. Subject taking medication or with any condition which might, in the opinion of an in-house physician either make participation dangerous to the subject or to others or affect the results.

Number of Subjects: A total of ten (10) subjects were studied. Using the t-distribution and assuming an average coefficient of variation (CV) of within individual variation of IAUC values of 25%, n=10 subjects has 80% power to detect a 35% difference in IAUC with 2 tailed p<0.05.

Protocol: The GI Laboratories protocol has been approved by the Western Institutional Review Board® which meets all the requirements of the US Food and Drug Administration (FDA), the Department of Health and Human Services (DHHS), the Canadian Health Protection Branch (HPB), Canadian Institutes of Health Research (CIHR) and the European Community Guidelines. All subjects provided written informed consent prior to starting the study.

The study used a single-blind, randomized controlled design. Each subject underwent treatments on separate days, with each subject performing up to 2 tests per week separated by at least one day. On each test day, subjects came to Glycemic Index Laboratories (GI Labs, 20 Victoria Street, Toronto, Ontario, Canada) in the morning after a 10-14 hour overnight fast. After being weighed and having two fasting blood samples obtained by finger-prick five minutes apart, the subject then consumed a test meal within 15 minutes. Further blood samples were obtained at 15, 30, 45, 60, 90 and 120 minutes after the start of the test meal. Subjects remained seated quietly during the 2 hours of the test. After the completion of the test they were offered a snack and then allowed to leave.

Sample preparation: The test beverages were matched for sweetness and consisted of 16.8 g (4 tsp) of sucrose or 13.2 g of 1:1DBSS mixed with 250 ml of water. Each subject was also given 200 ml of water in addition to the test beverage. Test meals were given in random order.

Sucrose: 16.8 grams of sucrose was weighed out and dissolved in 250 grams of cold water.

1:1DBSS: 13.2 grams was weighed out and dissolved in 250 grams of cold water.

Palatability: After consuming the test meal, subjects rated the palatability of the test meal using a visual analogue scale consisting of a 100 mm line anchored at the left end by "very unpalatable" and at the right end by "very palatable". Subjects made a vertical mark along the line to indicate their perceived palatability. The distance from the left end of the line to the mark made by the subject is the palatability rating; the higher the value, the higher the perceived palatability.

Blood Samples: Blood samples (2-3 drops each) were collected into 5 mL tubes containing a small amount of anticoagulant (sodium fluoride/potassium oxalate). The samples were mixed by rotating the tube vigorously and then refrigerated during the testing session. After completion of the test session, samples were stored at −20° C. prior to glucose analysis. Blood glucose analysis, using a YSI (Yellow Spring Instruments, OH) analyzer, took place within five days of collection.

Results: There were no protocol deviations and no adverse events were recorded. A total of 10 subjects were recruited for this study, all subjects completed all test meals. The subject group consisted of 5 males and 5 females, aged 44±13 years with a body mass index of 24.5±2.8 kg/m². The individual details are shown in Table 1 below.

TABLE 1

| ID | Sex | Ethnicity | Age (years) | Height (cm) | Weight (kg) | BMI (kg/m²) |
|---|---|---|---|---|---|---|
| 467 | M | Caucasian | 50 | 167.0 | 83.1 | 29.8 |
| 493 | F | Caucasian | 43 | 156.0 | 52.3 | 21.5 |
| 558 | M | Caucasian/ indigenous | 59 | 177.0 | 76.0 | 24.3 |

TABLE 1-continued

| ID | Sex | Ethnicity | Age (years) | Height (cm) | Weight (kg) | BMI (kg/m$^2$) |
|---|---|---|---|---|---|---|
| 565 | M | Caucasian | 58 | 171.0 | 76.4 | 26.1 |
| 579 | F | Black | 51 | 168.8 | 64.1 | 22.5 |
| 637 | M | Korean | 25 | 177.6 | 75.6 | 24.0 |
| 668 | F | Caucasian | 36 | 161.4 | 61.4 | 23.6 |
| 670 | M | Caucasian | 47 | 181.7 | 88.0 | 26.7 |
| 671 | F | Caucasian | 49 | 166.4 | 73.0 | 26.4 |
| 678 | F | Caucasian | 19 | 169.7 | 58.2 | 20.2 |
| MEAN | | | 43.7 | 169.7 | 70.8 | 24.5 |
| SD | | | 13.3 | 7.7 | 11.4 | 2.8 |

Analytical Variation for Blood Glucose Analysis: Analytical variation: Duplicate analysis was performed on 19 samples taken at 0 min. The mean±SD of blood glucose in these samples was 4.47±0.063 mmol/L for a CV of 0.9%. The mean±SD for the 20-5 and 0 min samples was 4.54±0.390 mmol/L for a CV of 2.2%, which is greater than analytical variation because it reflects both analytical variation and minute-to-minute variation in blood glucose. CV's of less than 6% are considered to be within acceptable analytical limits Palatability: Palatability scores are given in Table 2. There was no significant difference in palatability scores between the three test meals.

TABLE 2

| Test Meal | Adverse events (#) | Palatability (mm) | IAUC (mmol/L · min) | % Change IAUC from Sucrose (%) |
|---|---|---|---|---|
| Sucrose | 0 | 47 ± 9 | 80.2 ± 8.3 | — |
| 1:1DBSS | 0 | 60 ± 10 | 22.7 ± 4.8 | 73 ± 4 |

Figure 2:
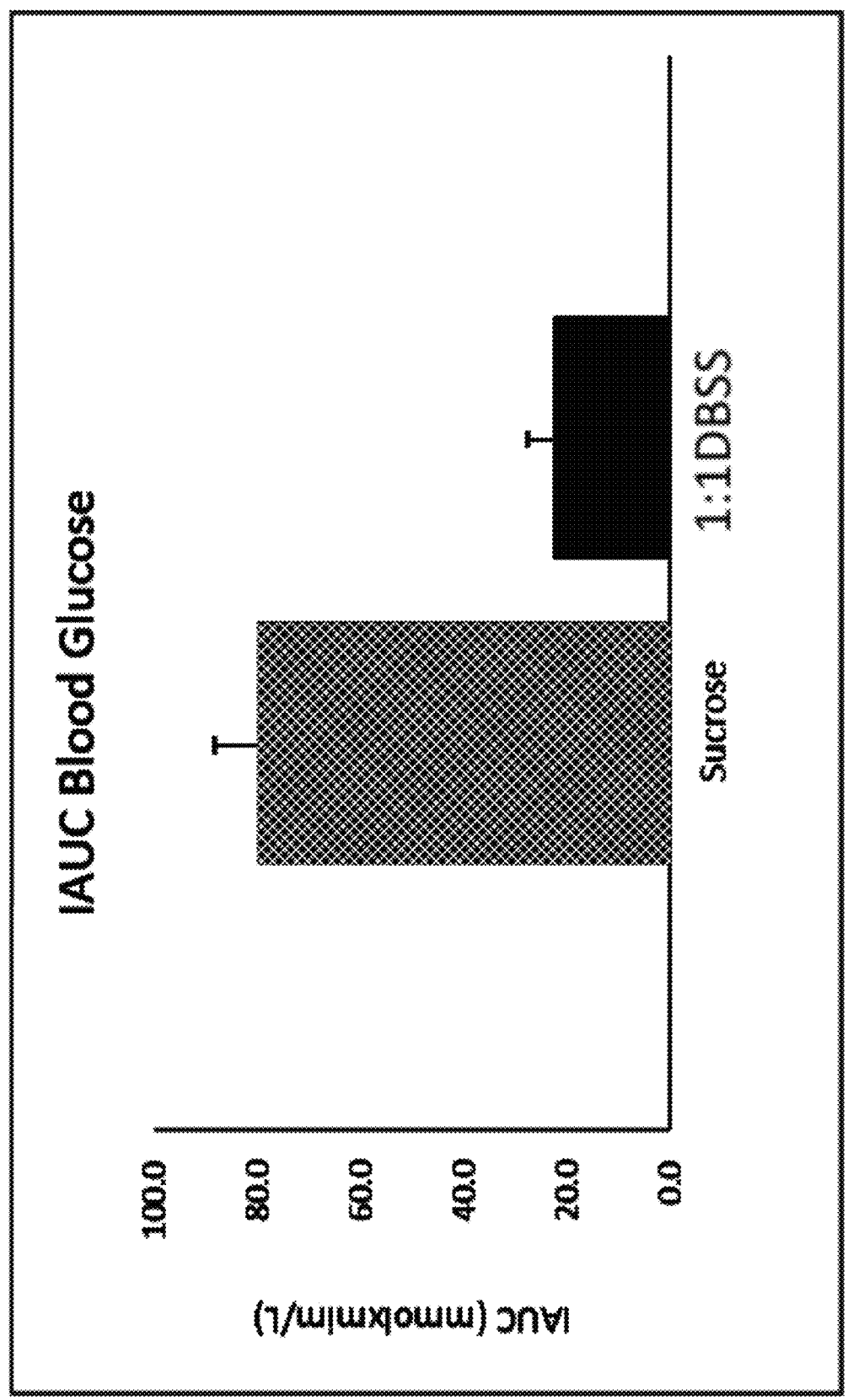
FIG. 2 illustrates the incremental glucose areas under the curve after responses to 16.8 grams of sucrose, or to 13.2 grams of a dairy-based composition-of-matter. The data are expressed as mean±SEM (bars with different letters are statistically significantly different with p<0.00001).

Blood glucose response: Mean fasting blood glucose was identical before each test meal within each series. The blood glucose responses to the test meals are illustrated in FIG. 1 and IAUC's are shown in FIG. 2. The blood glucose response after 1:1DBSS was significantly lower than the sucrose control at 15, 30, and 45 min (p<0.001). The IAUC after 1:1DBSS was statistically significantly lower than the sucrose control (p<0.00001).

Conclusion: There was no difference in the palatability scores between sucrose and the dairy sugar substitute (1:1DBSS). The postprandial glucose response to 1:1DBSS was significantly lower than the sucrose control. Expressed as a percent difference, the dairy sugar substitute resulted in a 73% lower glucose response compared to a dose of sucrose that was matched for sweetness. Substitution of sucrose with the dairy sugar substitute is likely to result in an attenuation of postprandial blood glucose levels.

Example 3

The following is an experiment in which various parameters are tested to determine optimal ratios between Lou-Han Guo extract and vanillin or citrus oil.

Materials. Food grade isomaltooligosaccharide tapioca powder (IMO) was obtained from Anhui Elite Industrial Co. LTD, China. Botanical source: *Manihot esculenta*. Lou-Han Guo (Monk fruit) extract was obtained from Monk Fruit Corp's Fruit-Sweetness™ monk fruit extract division (MFC-E30P). Botanical source: *Siraitia grosvenorii*. Natural vanillin was obtained from FoodArom™ (MET0000723). Botanical source: *Syzygium aromaticum* (clove). Rice hull was obtained from RIBUS Inc., St. Louis, Mo., USA (Nu-FLOW®), marketed as a natural, free-flowing, fine powder used to replace silica (silicon dioxide, a synthetic anticaking agent) as an anticaking agent or as a flavor carrier. Particle size 200 mesh screen (74 micron). Nu-FLOW® is natural and organic and made from 100% rice hulls that have been ground, steam sterilized, sifted and packaged; nothing is added and nothing is removed from the hulls; no enzymes, chemicals, solvents, extraction nor any other processes have been used in the manufacturing of Nu-FLOW® except as described herein. Botanical source: *Oryza sativa*.

High intensity sweetener with vanilla: Different ratios between Lou-Han Guo Extract and vanillin were tested, and the following was found.

Composition I: Lou-Han Guo extract comprising 30-55% mogroside V glycosides (30MV-55MV).

Composition II: Lou-Han Guo Extract comprising 25% mogroside V glycosides.

When tested Composition I yielded least taste defects at a ratio of 3:1 between those ingredients; less preferred ratios ranged between 3:1 and 10:1 by weight. In all experiments Lou-Han Guo 30MV, 50MV and 55MV exhibited virtually the same taste and sweetness qualities.

Composition II yielded least taste defects at a ratio of 1:1 between those ingredients, and less preferred ratios ranged between 1:1 and 1:0.1 by weight.

Processing included placing the dry mixtures in an oven in a 3 mm layer over a baking tray. Different baking temperatures were tested and it was found that baking under 93° C. for 30 seconds was the minimum threshold required to notice initial improvements in solubility and taste, whereas baking under 93° C. for 3 minutes was the preferred threshold for achieving a peak in such improvements.

The effective range of baking temperature was between 60° C. to 93° C., and the respective range of baking time was between 30 seconds to 3 minutes, beyond which there was no improvement in taste and solubility.

For Composition I and composition II the products preferred baking threshold of 93° C. for 3 minutes, was a sweetener with instant solubility and least taste defects such as bitter, licorice, metallic or astringent compared to the starting material and equivalent Lou-Han Guo or *Stevia* based sweeteners, free of maltodextrin (sugar alcohols), polyols and added sugar.

Composition I demonstrated the capacity to fully replace sugar in beverages, jelly, ice cream and yogurt applications. It is estimated to be about 30 times sweeter than sucrose. Recommended use of Composition I is 0.3-1.5% in a food product.

Composition II demonstrated the capacity to replace sugar on a 50-100% basis in beverages and fully replace sugar in ice cream and yogurt applications. It is estimated to be about 20 times sweeter than sucrose. Recommended use of Composition II is 1-3% in a food product.

High intensity sweetener with citrus: Two exemplary compositions were prepared using same baking protocols as presented above, while replacing vanillin with lemon oil extract on a 1-to-1 exchange; hence Composition III and Composition IV.

The end product in both Composition III and Composition IV was a high intensity sweetener with a citrus flavor, instant solubility and least taste defects such as bitter, licorice or metallic compared to equivalent Lou-Han and *Stevia* based sweeteners, free of maltodextrin, polyols and added sugar.

The high intensity sweeteners with citrus, Composition III and Composition IV, yielded no taste defects except for a hint of citrus when used in the recommended doses. Both Composition III and Composition IV demonstrated the capacity to fully replace sugar in fruity or citrusy beverages, jelly, ice cream and yogurt applications. Recommend use of Composition III is 0.3-1.5% in a food product, and Composition IV 1-3%.

Example 4

Rice hulls. The following is an experiment in which a rice hull ingredient is used to further mitigate taste defects. This composition was discovered during the development process, while working on the vanilla composition and trying to increase the powder flow by adding an excipient in the form of rice hull. It was surprisingly found that the rice hulls unexpectedly afforded a cane sugar flavor to the composition. Thereafter, rice hulls were added at different concentrations to the abovementioned compositions I and II, and it was found that adding 3-10 wt. % rice hull yielded least taste defects to the end product. Composition I and Composition II with rice hulls are referred to herein as Composition I-RH and Composition II-RH, respectively.

Experimenting with different ratios between Lou-Han Guo, vanillin and rice hulls, it was found that when Lou-Han Guo 30MV or 50MV were mixed with vanillin at a ratio of 30:1, adding 1-4 wt. % rice hulls to that mix creates a more subtle and neutral flavor, whereas adding 4-10 wt. % rice hulls yields a more pronounced cane sugar-like flavor. Effective rice hulls concentration threshold ranged 1-10 wt. %. Effective vanillin concentration threshold ranged 0.1-5 wt. %. The preferred weight ratio range between Lou-Han Guo 25MV and vanillin (Composition II-RH was 30:1 to 3:1)

At a preferred concentration range of 3-10 wt. % rice hulls, the mixes of both Composition I and Composition II had a sugar cane flavor with least taste defects. After baking the compositions under the preferred threshold of 93° C. for 3 minutes, the end product of both Composition I-RH and Composition II-RH had least taste defects such as licorice, metallic or astringent, compared to equivalent Lou-Han or *stevia* based sweetener, free of maltodextrin, polyols and added sugar.

Composition I-RH was tested to fully replace sugar in beverages, jelly, ice cream and yogurt applications; it is estimated to be about 30 times sweeter than sucrose.

Composition II-RH was tested to replace sugar on a 50-100% basis in beverages and fully replace sugar in ice cream and yogurt applications; it is estimated to be 20 times sweeter than sucrose.

Recommended use of Composition I-RH is 0.2-1.5% in s food product, and Composition II-RH is 1.0-2%.

Rice hull may be replaced by grounded peanut shell (medium roasted), and, or grounded hulls of barley and wheat, and/or dried grounded corncob, and, or dried grounded sugar cane husk.

Example 5

Exemplary compositions of sugar level substitute. It was found that when mixing the abovementioned Composition I-RH and Composition II-RH with an indigestible fiber ingredient (IMO or Inulin) in a certain ratios, the resultant products yield a sweetness level close to that of sucrose. In the case of Composition I-RH, a preferred ratio range of 0.6-2.5 wt. % NHPS to 99.4-97.5 wt. % indigestible fiber ingredient, yielded a sucrose equivalent level of sweetness with least taste defects. Effective ratio was 0.6-3 wt. % NHPS to 97-99.5 wt. % indigestible fiber ingredient.

The same ratio between ingredients applied to Composition II-RH, however, this version had a lower level of sweetness, about 70-80% equivalent to that of sucrose.

Having a sugar-like binding capacity, all sugar level substitute compositions were capable of replacing sugar in baking applications without added binders or fillers.

Composition I-RH demonstrated the capacity to fully replace sugar on a one-to-one basis in all industrial and consumers recipes including baking and can potentially serve as a tabletop item.

Composition II-RH demonstrated the capacity to replace sugar on a 50-100% basis in beverages, yogurt and ice cream, and fully replace sugar in baking; however, due to its lower level of sweetness, this version is a less preferred option for a tabletop item.

The preparation of the sugar substitute vanilla with sweetness level equivalent to that of sucrose, requires a specific ratio between the concentrations of the sweetening and the flavor components. To yield a sucrose level of sweetness along with a clean taste, the sweetening component Luo-Han Guo should be at the concentration range of 0.6-2 wt. %, whereas to mask a aftertaste the flavor-balancing ingredient (e.g., vanillin) and the grain hulls ingredient (e.g., rice hulls) should be maintained at a 1:1 ratio, and used as a single component at the concentration range of 1-1.5 wt. %. The ratio between the high-potency sweetening ingredient, the flavor-balancing ingredient, and the grain hulls ingredient is kept as about 1:1:1.

According to an embodiment of the present invention, the composition of the vanilla sugar substitute with sweetness level of sucrose ("sugar level substitute") may comprise the ingredients and amounts presented in Table 3 below.

TABLE 3

| Ingredient | wt. % | Range wt. % |
| --- | --- | --- |
| Tapioca IMO | 97 | 94.0-97.4 |
| Luo-Han Guo | 1.0 | 0.6-2.0 |
| Natural vanillin | 1.0 | 0.6-2.0 |
| Rice hulls | 1.0 | 0.6-2.0 |

According to an embodiment of the present invention, the composition of the high-volume sweetener with sweetness level of approximately 30-times of sugar ("high-volume sweetener") may comprise the ingredients and amounts presented in Table 4 below.

TABLE 4

| Ingredient | wt. % | Range wt. % |
| --- | --- | --- |
| *Acacia* gum fiber/IMO | 5 | 3-30 |
| Luo-Han Guo | 60 | 55-75 |
| Natural vanillin | 30 | 5-33 |
| Rice hulls | 5 | 5-10 |

For high intensity sweetener syrups, dry Lou-Han Guo extracts with vanillin and 1-10% rice hulls were added to solutions of alcohol and glycerin, and afforded the following syrup compositions.

Composition I-RH a 10% vanillin solution in alcohol, in a ratio of 1:2, produced a liquid sweetener with least taste defects. The concentrations of vanillin below 10% were less effective. The liquid sweetener comprised 25% Lou-Han Guo and 7% vanillin.

Composition II-RH required more vanillin to yield least taste defects. It was found that mixing Lou-Han Guo 25MV with a 25% vanillin solution in alcohol, at a ratio of 1:2, produced a liquid sweetener with best taste qualities. The liquid sweetener comprised 25% Lou-Han Guo and 17% vanillin.

Experimenting with baking the liquid products of both options under different temperatures for different durations, afforded that baking under 100° C. for 3 minutes or until noticing slight caramelization of the liquid, created a product with improved flavor and least taste defects. Effective range of baking temperature was between 65-120° C., whereas the respective range of baking time was ranged over 30-1 minutes respectively.

The end product in both options after using the preferred baking threshold of 120° C. for 3 minutes, was a medium intensity liquid sweetener with a syrupy texture, a brown sugar caramel flavor, and the least taste defects such as bitter, metallic or licorice afternotes, compared to the starting material and equivalent syrup sweeteners, free of synthetic molecules, maltodextrin, sugar alcohol and added sugar.

An alcohol free syrup sweetener can be produced through the same protocol in both options upon substitution of the alcohol with glycerin on a 1-to-1 basis. Glycerin should be derived from botanical sources, as non-botanical sources are less desirable.

Example 6

Spray drying preparation process: An alternative to baking the compositions in order to improve the taste thereof is spray drying, which confers the desired heating to the composition.

High intensity sweetener cane sugar flavor: The preparation of an exemplary composition-of-matter, according to some embodiments of the present invention, started by mixing Lou-Han Guo 30MV or 50MV and vanillin at a weight ratio range of 30:1 to 10:1 Lou-OHan Guo to vanillin, and rice hull at a weight ratio of 1:1-0.6:1 rice hull to Lou-Han Guo, then blending that mixture with water to yield a liquid slurry ready for spray drying/agglomeration through a one step or two steps protocol.

The preparation of another exemplary composition-of-matter, according to some embodiments of the present invention, started by mixing Lou-Han Guo 25MV with vanillin at a weight ratio of 4:1 to 3:1 Lou-Han Guo to vanillin, and rice hull at a weight ratio of 1:1-0.6:1 rice hull to Lou-Han Guo, then blending that mixture with water to yield a liquid slurry ready for spray drying/agglomeration through a single step or two steps protocol.

The liquid slurry was spray dried alone or over a bed of acacia gum and/or cellulose under a temperature threshold ranging about 65-93° C., until yielding a dry composition.

Optionally, the spray drying process applies initially only to the composition of Lou-Han Guo and vanillin at the ratios presented above; and after the mixture undergone spray drying, the dried composition was mixed with rice hulls at a final concentration of 3-10% rice hulls, to afford the final composition-of-matter.

The spray drying temperature should be carefully adjusted to prevent formation of scorch particles. Though initial experiments have shown that spray drying under 120° C. can yield a viable product, a slower drying process utilizing a lower temperature range of 55-93° C. have shown to yield more desirable end products with lower scorch/ash content.

Sucrose level sugar substitute with vanilla: The preparation of an exemplary composition-of-matter, according to some embodiments of the present invention, started by mixing Lou-Han Guo 30MV or 50MV and vanillin at a ratio of 3:1, and the mixture was blended with the indigestible fiber ingredient (IMO or inulin) at a weight ratio of 2.5% combined Lou-Han Guo/vanillin mixture to 97.5% indigestible fiber ingredient.

The preparation of another exemplary composition-of-matter, according to some embodiments of the present invention, started by mixing Lou-Han Guo 25MV and vanillin at a ratio of 1:1, and the mixture was blended with the indigestible fiber ingredient (IMO or inulin) at a ratio of 2.5% Lou-Han Guo/vanillin mixture to 97.5% indigestible fiber ingredient.

The ratio range between ingredients was 1-3 wt. % Lou-Han Guo/vanillin mixture to 99-97 wt. % indigestible fiber ingredient.

The dry blended mixtures were mixed with water to yield a slurry ready for spray drying/agglomeration under a temperature range of about 65-93° C. through a single step or two steps protocol until yielding the end product.

Sucrose level sugar substitute with citrus oil: Following the same production protocol as that used for the sucrose level sugar substitute with vanilla, except that vanillin was replaced with lemon oil extract on a 1-to-1 basis.

Sucrose level sugar substitute (cane sugar substitute): The preparation of these exemplary compositions started with a mixture of Lou-Han Guo and vanillin at a weight ratio range of 10:1 to 3:1 and rice hull at a weight ratio of 0.6:1 to 1:1 Lou-Han Guo/rice hull for the mixture of Lou-Han Guo 30Mv and 50MV, and a weight ratio range of 3:1 to 2:1 for the mixture with Lou-Han Guo 25MV and vanillin and rice hull at a weight ratio of 0.6:1 to 1:1.

The indigestible fiber ingredient (IMO or inulin) was added to the mixtures at a ratio of 1.9-2.3% mixture to 98.1-97.7% indigestible fiber ingredient by weight. Effective ratio ranged 1.5-2.5% combined Lou-Han Guo, vanillin, and rice hull mixture to 98.5-97.5% indigestible fiber ingredient.

The resulting mixtures was blended with water to yield a liquid slurry ready for spray drying/agglomeration under a temperature range of 65-93° C. through a single or two steps protocol until yielding a dry product.

Optionally, the dry mixture of agglomerated Lou-Han Guo, vanillin and indigestible fiber ingredient at the above ratios, was mixed with rice hulls at a concentration ranging 1-1.5 wt. % until yielding the end product composition-of-matter, according to some embodiments of the present invention. Effective rice hulls concentration ranged about 0.5-2.0 wt. %.

It is noted that the drying process should was carefully monitored to grant water movement below 5 (<5) for the end product.

The agglomerated composition-of-matter was afforded as granules in a preferred size of 20-80 mesh, similar to that of sugar granules.

Example 7

Organoleptic evaluations. In order to evaluate the effect of rice hulls on the performance of the composition-of-matter presented herein, compared to the performance of sugar substitutes disclosed in U.S. Patent Application Publication No. 2016/0165941, and compared to the performance of natural cane sugar, samples of various food products were prepared and evaluated by a of expert sensory (organoleptic) panel. As a standard for sugar-like characteristic, natural cane sugar was used to prepare the same products based on essentially the same recipe as those used for the sugar substitute samples.

The objectives of the organoleptic tests was to characterize sensory profiles for different products from three different food categories, in order to test whether the composition-of-matter presented herein has a similar sensory profile to cane sugar, and superior to the compositions disclosed in U.S. Patent Application Publication No. 2016/0165941.

The food product categories that were tested included: (1) butter cookies; (2) chocolate cake; and (3) cold coffee with milk. In each category, a sensory profile was built for three samples: (1) a composition-of-matter, according to some embodiments of the present invention, referred to herein as the "sugar level substitute", and denoted "BTS101"; (2) a sugar substitute composition similar to BTS101 but without rice hulls (as disclosed in U.S. Patent Application Publication No. 2016/0165941), and denoted "BTS90"; and (3) plain cane sugar, denoted "sugar."

The food products were tested among a "New Sense Research" (25 Efal st., Amot Platinum Tower, Kiryat Arie, Petach Tikva, Israel) expert panel, which included 10-12 professional tasters, all supertasters, who were screened according to the ISO standards for sensory sensitivity, consistency and sensory memory. The panelists met the following criteria: (1) below the age of 65; (2) without medical problems and nutritional limitations; (3) not taking medications regularly; (4) verbal, without language restrictions; and (5) motivated. The expert panel is a universal panel and therefore, for the purpose of adjusting for sugar substitutes tasting, the panel members were trained in training sessions for each category. The training sessions consisted the following subjects: (1) building sensory vocabulary for the category; (2) learning the tasting protocol for the category in order to calibrate all the tasters to a uniform taste; (3) training the panel members on the different attributes intensities; (4) calibration all the panel members on the scales; and (5) training on building a sensory profile for the products according to the attributes that were decided on the vocabulary.

After training and calibrating the panel members on each category held another meeting for each category in order to build a sensory profile (a "spider diagram") for the tested products in each category, according to the attributes that were decided on the sensory vocabulary.

Butter cookies category sensory profile. Butter cookies were prepared as follows, for a batch of 45 small cookies, 175 grams soft butter, 200 grams of BTS101, BTS90 or sugar, two egg-yolks, 2.5 cups of plain wheat flour, 0.5 is of baking powder and a small amount of salt. The butter and BTS101/BTS90/sugar were mixed in a food processor, and yolks were added thereto. Flour and salt were thereafter added and kneaded to afford homogeneous dough. The dough was flattened to a rounded dick, wrapped with plastic and refrigerated for half an hour. The cooled dough was thereafter cut into small round disks and placed on a baking sheet. The cookies were baked at 175° C. for 8-10 minutes.

Butter cookies were evaluated for properties that are relevant to the product category, and afford a comprehensive comparison relevant to all aspects of the sugar substitute samples, including all sensory attributes, which included color, size, hardness, thickness, crumbling, airiness, melt in mouth, stickiness to teeth, sweetness, butter taste, baking taste, and off-flavor (taste defects).

Figure 3A:
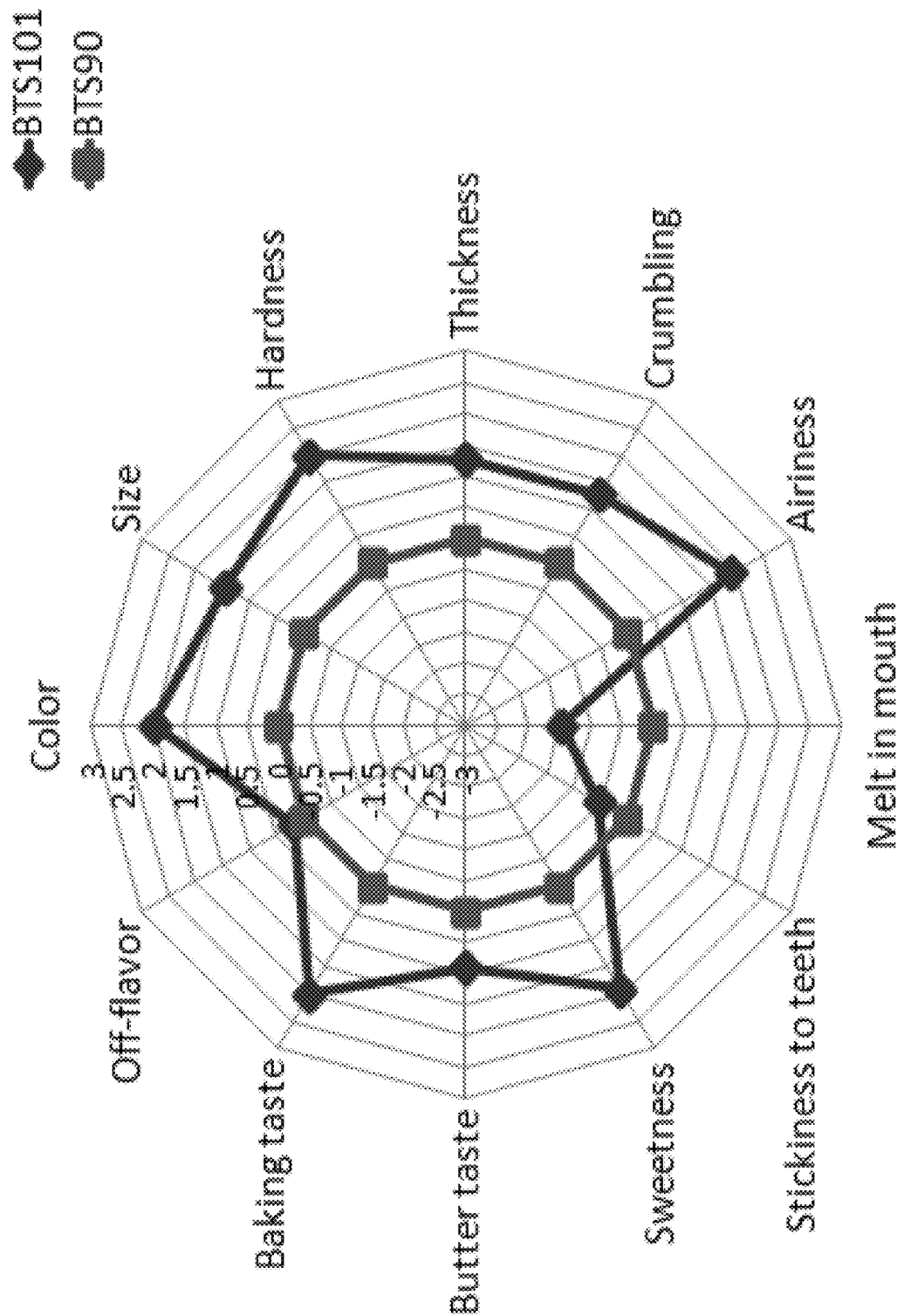
FIGS. 3A and 3B illustrate comparative spider diagrams of the sensory profile for butter and sugar cookies.
Figure 3B:
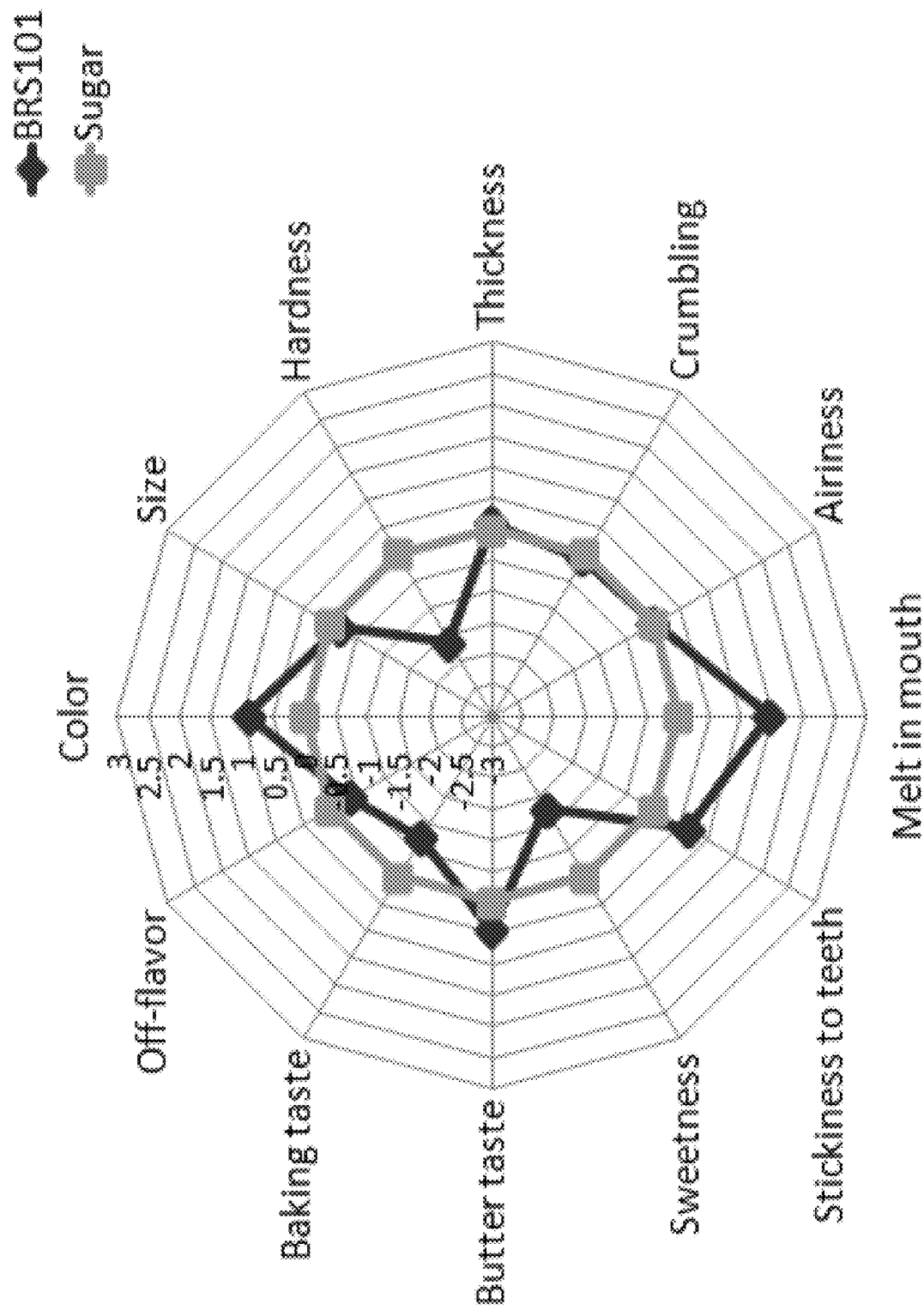

FIGS. 3A and 3B illustrate comparative spider diagrams of the sensory profile afforded for butter cookies category comparing BTS101 to BTS90 (FIG. 3A) and comparing BTS101 to Sugar (FIG. 3B).

As can be seen in FIGS. 3A and 3B, the sensory profile of the cookies with BTS101 is very different from the sensory profile of the cookies with BTS90 in all the sensory attributes, except for stickiness to teeth which was quite similar. The sensory profile of the cookies with BTS101 was more similar to the sensory profile of the cookies with sugar. However, they are some texture differences compare to the cookies with sugar. In terms of taste attributes, the cookies with BTS101 are less sweet and having less baking taste, and they were darker than the cookies with the sugar.

Chocolate cake category sensory profile. Chocolate cake was prepared as follows, for a batch of 2 English cake forms, 2.5 cups of plain wheat flour, 300 grams of BTS101, BTS90 or sugar, ⅔ cups of cocoa powder, 2 is of baking powder, 1 tb sodium bicarbonate powder, 3 eggs, 1 cup of oil and 2 cups of water. All dried ingredients were premixed and eggs, oil and water were added thereto and mixed to afford homogeneous dough. The dough was poured into cake forms and places in a preheated oven set at 170° C., and baked at 170° C. for 30-35 minutes.

The chocolate cake was evaluated for properties that are relevant to the product category, and afford a comprehensive comparison relevant to all aspects of the sugar substitute samples, including all sensory attributes, which included color, smell, sweetness, bitterness, chocolate taste, crumbling, dryness/moisture, compressible/airiness, mashable, and off-flavor (taste defects).

Figure 4A:
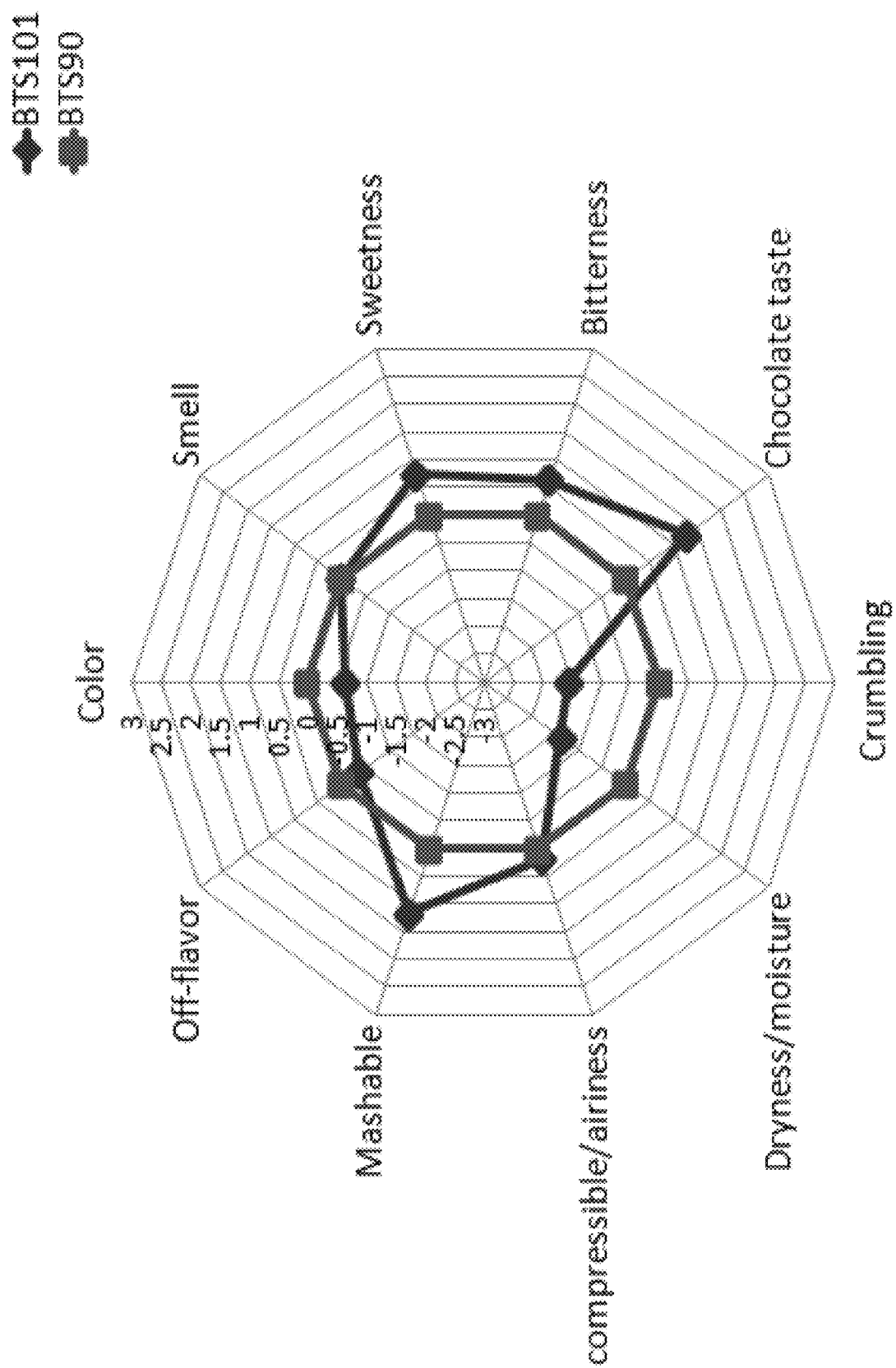
FIGS. 4A and 4B illustrate the comparative spider diagrams of the sensory profile for cake.
Figure 4B:
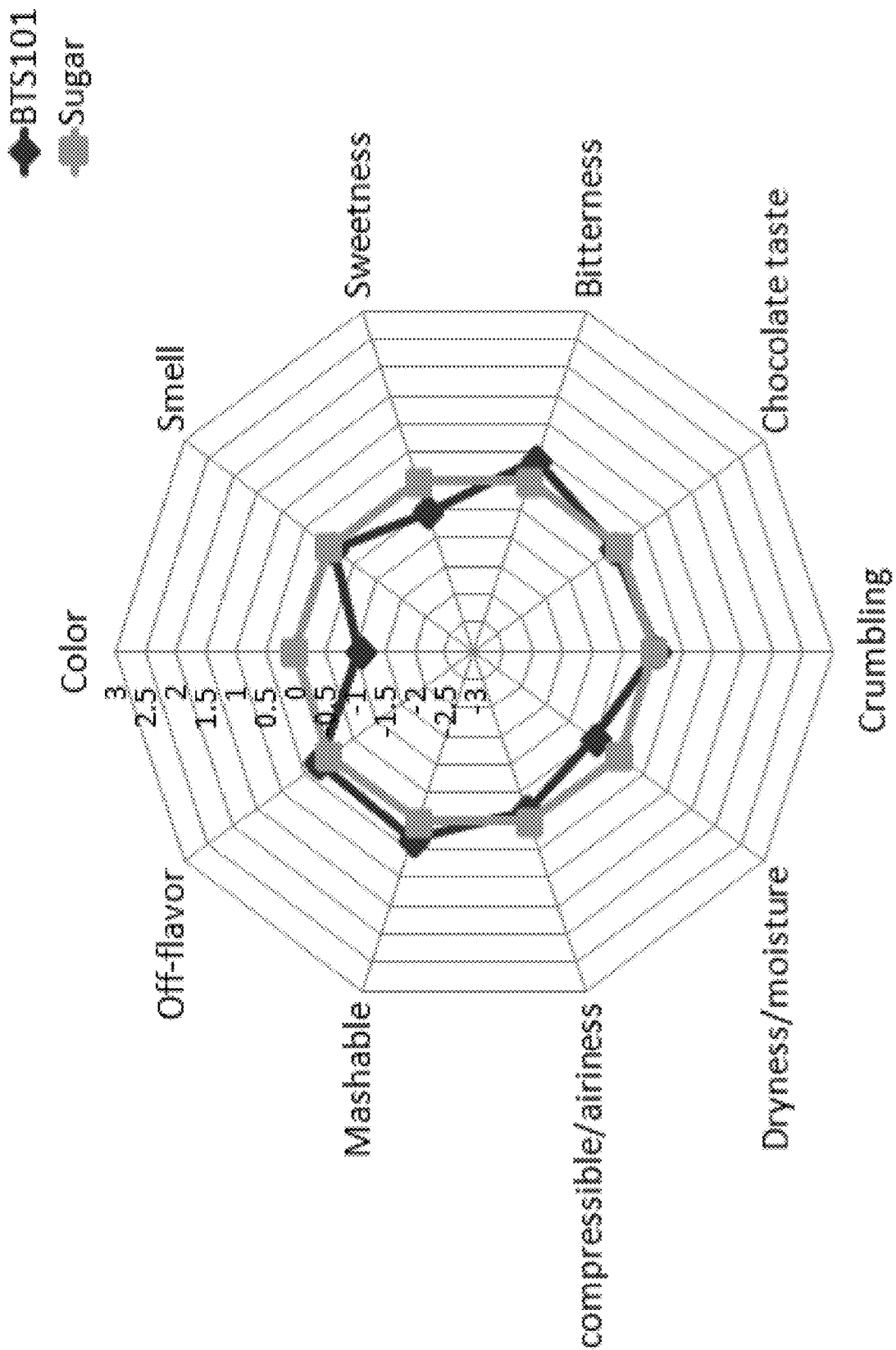

FIGS. 4A and 4B illustrate comparative spider diagrams of the sensory profile afforded for chocolate cake category comparing BTS101 to BTS90 (FIG. 4A) and comparing BTS101 to Sugar (FIG. 4B).

As can be seen in FIGS. 4A and 4B, the sensory profile of the cake with BTS101 is different from the sensory profile of the cake with BTS90, in most of the sensory attributes. The sensory profile of the cake with BTS101 was very similar to the profile of the cake with sugar in most of the sensory attributes; however, it is less dark, slightly less sweet and less dry than the product with sugar.

Cold coffee with milk category sensory profile. Cold coffee with milk was prepared as follows, for one liter of coffee, 5 tb of Taster's Choice instant coffee, 100 ml of hot water, 100 ml of cold milk, 800 ml of cold water, and 75 grams of BTS101, BTS90 or sugar. The dry ingredients were combined and dissolved in the hot water, and the cold water was added thereto. Cold coffee was served with ice cubes.

The cold coffee with milk was evaluated for properties that are relevant to the product category, and afford a comprehensive comparison relevant to all aspects of the sugar substitute samples, including all sensory attributes, which included color, smell, sweetness, sourness, bitterness, coffee taste, thickness, milkiness, body, and off-flavor (taste defects).

Figure 5A:
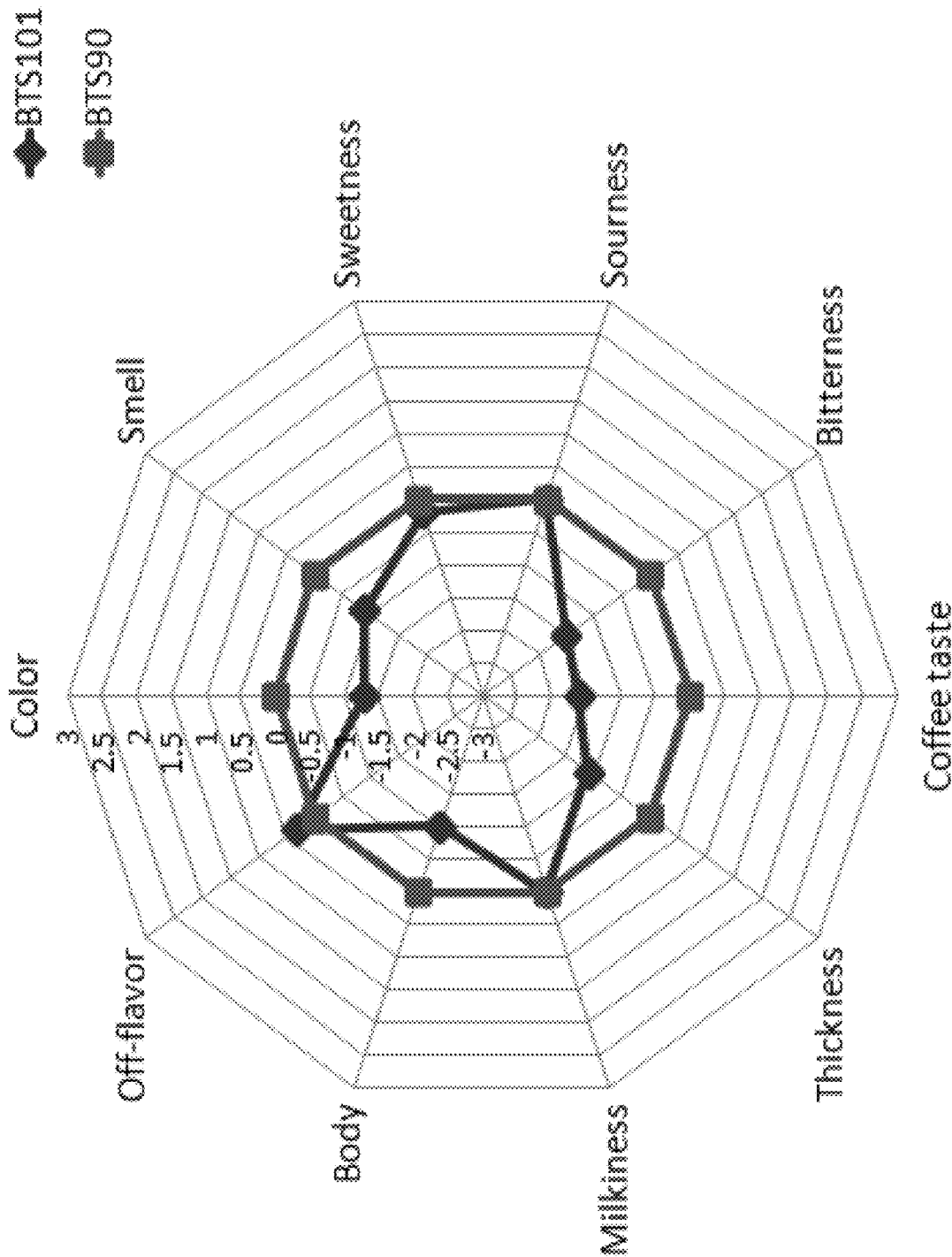
FIGS. 5A and 5B illustrate the comparative spider diagrams of the sensory profile for cold coffee.
Figure 5B:
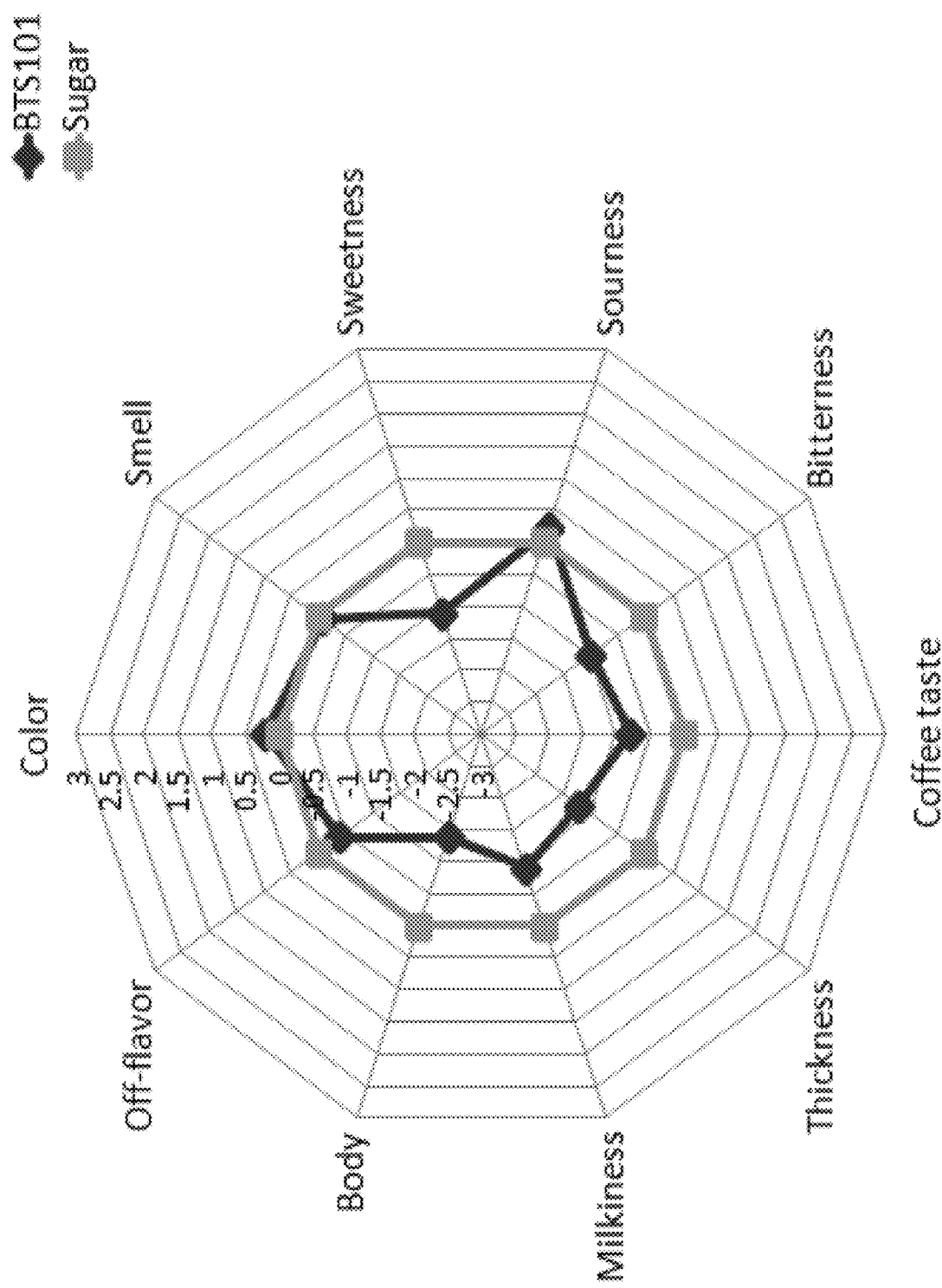

FIGS. 5A and 5B illustrate comparative spider diagrams of the sensory profile afforded for cold coffee with milk category comparing BTS101 to BTS90 (FIG. 5A) and comparing BTS101 to Sugar (FIG. 5B).

As can be seen in FIGS. 5A and 5B, the sensory profile of coffee with BTS101 has different sensory profile compare to the product with BTS90 and also compare to the product with sugar. Compare to the product with sugar, the coffee with BTS101 is less sweet, less bitter and has less coffee taste. In addition, it is less thick, less milky and has less body. Compare to the product with BTS90, the product with BTS101 is much less bitter and has less coffee taste. In addition it is less thick, has less body, less dark and has weaker smell.

The results of the organoleptic sensory tests demonstrate that the composition-of-matter presented herein are capable of replacing sugar in all food categories, and in addition are superior to similar compositions known in the art.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A dairy sugar substitute comprising:
   at least one dairy-derived ingredient in an amount of about 97% to about 99% by weight;
   at least one high-potency sweetening ingredient in an amount of about 0.8% to about 1.5% by weight; and
   at least one flavor-balancing ingredient in an amount of about 0.1% to about 1.2% by weight;
   wherein the dairy sugar substitute lacks sugar.

2. The dairy sugar substitute according to claim 1 further comprising at least one grain hull ingredient.

3. The dairy sugar substitute according to claim 1, wherein the at least one dairy-derived ingredient is at least one of dried low-fat milk, a dried whole milk, a dried whey protein, or a dried nonfat milk.

4. The dairy sugar substitute according to claim 1, wherein the at least one high-potency sweetening ingredient is at least one of *Siraitia grosvenorii* derived substance, a monk fruit extract having 25-55% mogroside v, a mogroside, esgoside, or a *Stevia rebaudiana* derived substance.

5. The dairy sugar substitute according to claim 1, wherein the at least one flavor-balancing ingredient is at least one of *Vanilla planifolia* derived substance, a natural vanillin, a citrus oil extract, or milk minerals.

6. The dairy sugar substitute according to claim 2, wherein the at least one grain hull ingredient is at least one of rice hulls, medium roasted peanut shells, barley hulls, wheat hulls, dried grounded corncob, or dried grounded sugar cane husks.

7. The dairy sugar substitute according to claim 2, wherein the at least one grain hull ingredient is in an amount of about 0.5% to about 2% by weight.

8. The dairy sugar substitute according to claim 1 substantially devoid of a sugar alcohol.

9. The dairy sugar substitute according to claim 1 substantially devoid of an artificial or synthetic sweetener.

10. The dairy sugar substitute according to claim 1 substantially devoid of a steviol glycoside or substantially devoid of an isolated form of Rebaudioside A.

11. The dairy sugar substitute according to claim 1 having a glycemic response of about 35.

12. A process for preparing a dairy sugar substitute comprising:
    mixing at least one dairy-derived ingredient in an amount of about 97% to about 99% by weight, at least one high-potency sweetening ingredient in an amount of about 0.8% to about 1.5% by weight, and at least one flavor-balancing ingredient in an amount of about 0.1% to about 1.2% by weight to yield a mixture, wherein the mixture lacks sugar; and
    heating mixture at a temperature of about 30° C. to about 120° C. for a time of about 30 minutes to about 0.5 minutes.

13. The process according to claim 12 further comprising adding a grain hull ingredient either prior or after the heating step.

14. The process according to claim 13, wherein the heating step is performed in a dry oven.

15. The process according to claim 12 further comprising adding water to the mixture to form a slurry prior to the heating step; and subjecting the slurry to spray drying.

16. A food product comprising the dairy sugar substitute according to claim 1.

17. The food product according to claim 16, substantially devoid of at least one of: (1) a sugar alcohol; (2) artificial or synthetic sweetener; or (3) a steviol glycoside, or any *Stevia rebaudiana*-derived substance or substantially devoid of an isolated form of Rebaudioside A.

18. The food product according to claim 16 that induces a glycemic response in healthy humans lower than a glycemic response of sugar in healthy humans.

* * * * *